United States Patent
Noszticzius et al.

(10) Patent No.: US 8,512,671 B2
(45) Date of Patent: Aug. 20, 2013

(54) PERMEATION METHOD AND APPARATUS FOR PREPARING FLUIDS CONTAINING HIGH PURITY CHLORINE DIOXIDE

(76) Inventors: Zoltán Noszticzius, Budapest (HU); Sándor Balogh, Kecskemét (HU); Emese Merkertné Balogh, legal representative, Kecskemét (HU); Levente Balogh, legal representative, Budapest (HU); Mária Gyökérné Wittmann, Budapest (HU); Kristóf Kály-Kullai, Budakeszi (HU); Marianna Megyesi, Budapest (HU); András Volford, Budapest (HU)

( * ) Notice: Subject to any disclaimer, the term of this patent is extended or adjusted under 35 U.S.C. 154(b) by 49 days.

(21) Appl. No.: 12/441,941

(22) PCT Filed: Sep. 21, 2007

(86) PCT No.: PCT/HU2007/000087
§ 371 (c)(1),
(2), (4) Date: Aug. 24, 2009

(87) PCT Pub. No.: WO2008/035130
PCT Pub. Date: Mar. 27, 2008

(65) Prior Publication Data
US 2010/0189631 A1    Jul. 29, 2010

(30) Foreign Application Priority Data
Sep. 21, 2006 (HU) .................... 0600735

(51) Int. Cl.
*C01B 11/02* (2006.01)
*B01J 7/02* (2006.01)
*B01J 19/00* (2006.01)
*C25B 1/26* (2006.01)

(52) U.S. Cl.
USPC ........... 423/477; 423/478; 422/239; 422/240; 205/499

(58) Field of Classification Search
USPC .............. 423/477, 478; 95/45–56; 210/636, 210/640, 641, 643, 644, 649, 650; 205/499
See application file for complete search history.

(56) References Cited

U.S. PATENT DOCUMENTS

| 3,810,969 A | 5/1974 | Schlumberger |
| 4,683,039 A * | 7/1987 | Twardowski et al. ......... 205/500 |

(Continued)

FOREIGN PATENT DOCUMENTS

| WO | 94/07814 | 4/1994 |
| WO | 9924356 | 5/1999 |

(Continued)

OTHER PUBLICATIONS

EPA Guidance Manual, Chlorine Dioxide, Apr. 1999, pp. 4-1 to 4-39.*

(Continued)

*Primary Examiner* — Steven Bos
*Assistant Examiner* — Justin Bova
(74) *Attorney, Agent, or Firm* — Jason D. Voight

(57) ABSTRACT

Method to prepare fluids (liquids and gases) containing pure chlorine dioxide which is not contaminated by the starting materials or the byproducts of the chlorine dioxide synthesis or to deliver pure chlorine dioxide into any medium capable of dissolving chlorine dioxide, wherein the chlorine dioxide generated in the process is transported across a pore free polymeric membrane via selective permeation into the target medium. Apparatus to realize the said method, wherein the generation of chlorine dioxide is carried out in such a reactor where some or all walls comprising the reactor, or the walls of a permeator unit attached to the reactor, are made of the said pore free polymer, characteristically some kind of silicone rubber, which is highly permeable to chlorine dioxide, but which is practically impermeable for the acidic and corrosive reagents used for the chlorine dioxide synthesis, its permeability being at least 3 orders of magnitude lower for these contaminating components compared to that of chlorine dioxide. The invention can be realized both by batch and by continuous reactors.

17 Claims, 8 Drawing Sheets

(56) References Cited

U.S. PATENT DOCUMENTS

Figure 1:
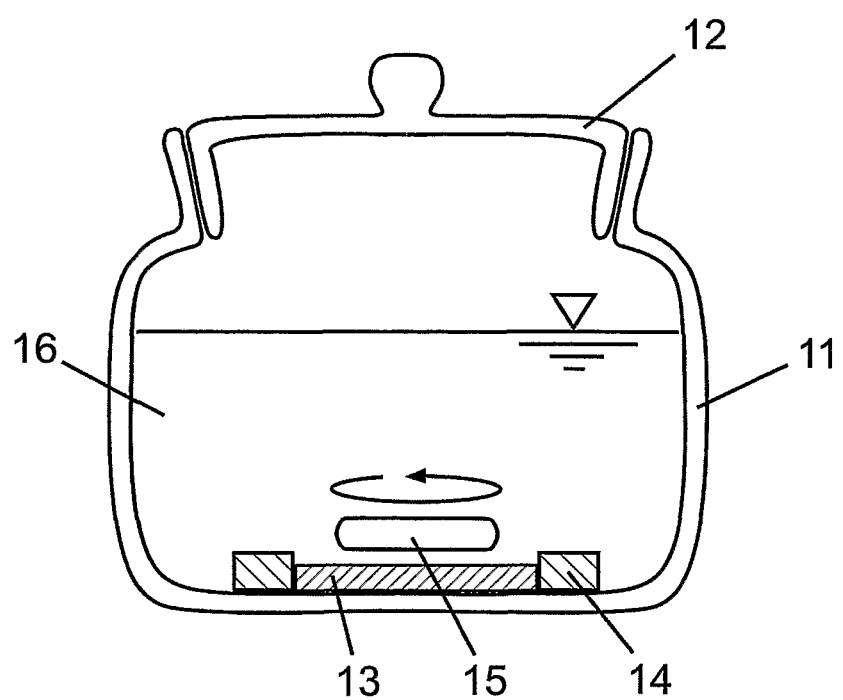

| | | | |
|---|---|---|---|
| 5,009,875 | A | 4/1991 | Kelley et al. |
| 5,032,279 | A | 7/1991 | Lee |
| 5,565,182 | A * | 10/1996 | Sokol ............................ 423/478 |
| 5,698,011 | A * | 12/1997 | Chung et al. ...................... 95/45 |
| 5,932,085 | A * | 8/1999 | Cowley et al. ................ 205/499 |
| 6,007,772 | A | 12/1999 | Green |
| 6,238,643 | B1 | 5/2001 | Thangaraj et al. |
| 6,432,322 | B1 | 8/2002 | Speronello et al. |
| 6,602,466 | B2 | 8/2003 | Hamilton et al. |
| 6,607,696 | B1 | 8/2003 | Hamilton et al. |
| 6,676,850 | B2 | 1/2004 | Speronello et al. |
| 6,764,661 | B1 | 7/2004 | Girard |
| 7,008,543 | B2 * | 3/2006 | Newkirk et al. .............. 210/667 |
| 2004/0241065 | A1 | 12/2004 | Kampa et al. |
| 2006/0013751 | A1 * | 1/2006 | Martin et al. ................. 422/241 |
| 2006/0034750 | A1 | 2/2006 | Lee et al. |
| 2006/0120945 | A1 | 6/2006 | Warner et al. |

FOREIGN PATENT DOCUMENTS

| | | |
|---|---|---|
| WO | 0200332 A1 | 1/2002 |
| WO | 03000586 A1 | 1/2003 |
| WO | 2004030454 A1 | 4/2004 |
| WO | 200511759 A1 | 2/2005 |
| WO | 2006020704 A2 | 2/2006 |
| WO | 2006062455 A1 | 6/2006 |
| WO | 2006062456 A1 | 6/2006 |

OTHER PUBLICATIONS

"Chlorine Dioxide Processes," Apr. 13, 2005, pp. 1-3.*

Kobayashi, T. et al., "Porous Polydimethylsiloxane Membranes Treated with Aminopropyltrimethoxysilane", Journal of Applied Polymer Science, 1994, vol. 51, pp. 483-489.

Schueth, F. et al., "Handbook of Porous Solids", 2002, pp. 2285-2305, Wiley-VCH Verlag GMBH.

De Bo, I. et al., "Investigation of the Permeability and Selectivity of Gases and Volatile Organic Compounds for Polydimethylsiloxane Membranes", Journal of Membrane Science, 2003, vol. 215, pp. 303-319.

Jonquieres, A. et al., "Industrial state-of-the-art of pervaporation and vapour permeation in the western countries", Journal of Membrane Science, 2002, vol. 206, pp. 87-117.

T. C. Merkel, T.C. et al., "Gas Sorption, Diffusion, and Permeation in Poly(dimethylsiloxane)", Journal of Polymer Science: Part B: Polymer Physics, vol. 38, 415-434 (2000).

Kieffer, R.G. et al. "Disproportionation of Chlorous Acid. I. Stiochiometry", Inorg. Chem. 1968, 7(2), 235-239.

Kieffer, R.G. et al. Disproportionation of Chlorous Acid. II. Kinetics; Inorg. Chem. 1968, 7(2), 239-244.

Stern, S.A., "Polymers for gas separation: the next decade", Journal of Membrane Science, 94 (1999) 1-65.

Crank, J., "The Mathematics of Diffusion", 2nd edition; Clarendon Press, Oxford (1975), pp. 44-52.

* cited by examiner

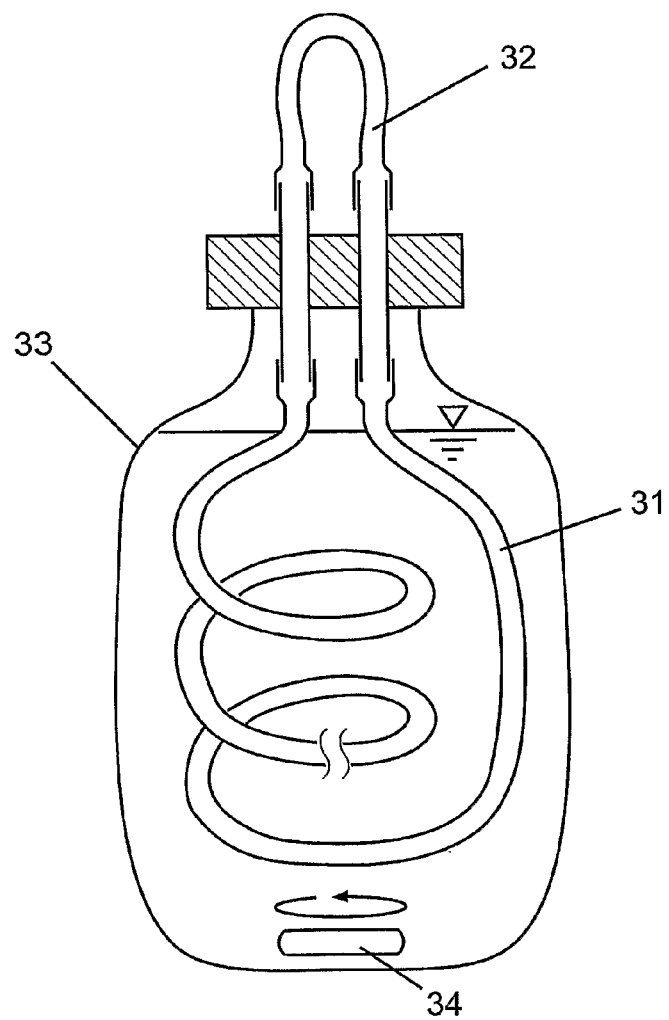
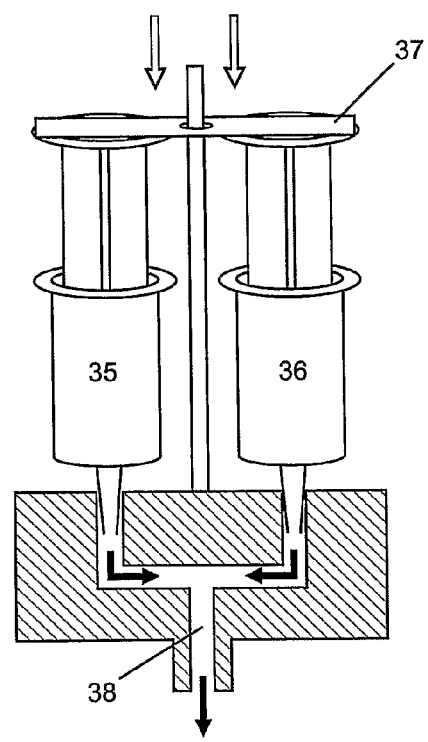
Figure 3a                    Figure 3b

PERMEATION METHOD AND APPARATUS FOR PREPARING FLUIDS CONTAINING HIGH PURITY CHLORINE DIOXIDE

This is the National Stage of International Application PCT/HU2007/000087, filed Sep. 21, 2007.

TECHNICAL FIELD

The object of the invention is a method to prepare fluids (i.e. liquids and gases) containing pure chlorine dioxide which is not contaminated by the starting materials or the byproducts of the chlorine dioxide synthesis or to deliver pure chlorine dioxide into any fluid target medium capable of dissolving chlorine dioxide, wherein the chlorine dioxide generated in the process is transported across a pore free polymeric membrane via selective permeation into the fluid target medium. The invention also relates to different apparatus to realize said method.

BACKGROUND OF THE INVENTION

Use of Chlorine Dioxide

Ideal Biocide and Bleaching Agent

Chlorine dioxide is a very effective biocide. According to the Annual Research Report, Southwest Research Institute, San Antonio, Tex., 1996, "Chlorine dioxide is a powerful biocide that can kill fungus, bacteria, and viruses at levels of 0.1 to 1 part per million in contact times of a few minutes." Chlorine dioxide is also effective against protozoan cysts like the one causing e. g. malaria. Most of the other antimicrobials should be applied in orders of magnitude higher concentrations to be as effective as chlorine dioxide. However, applying such large quantities of an antimicrobial agent is costly, moreover these agents should be removed by rinsing after the disinfection, which causes further complications and costs. The use of an aqueous chlorine dioxide solution can be regarded as ideal in this respect because this compound is a water soluble gas which evaporates together with the water after disinfection.

A further advantageous property of chlorine dioxide is its selectivity. This selective oxidizer does not react with organic acids, ethers, alkanes, alcohols, aldehydes, aliphatic amines, ammonia, carbohydrates, fats, nucleic acids and most of the amino acids (except tyrosine and the sulfur containing amino acids). The actual list of non-reactive compounds is much longer. This is an advantageous property of chlorine dioxide because except killing bacteria and viruses it barely participates in other reactions thus it is easy to reach a critical concentration required for disinfection even in an environment contaminated by organic compounds. When applying e.g. chlorine gas as a disinfectant in a contaminated environment achieving the critical concentration is more difficult, as chlorine reacts with various organic compounds. This is a problem not only because in such a case disinfection requires much more chlorine but the chlorinated compounds produced this way can be harmful to the human health (e.g. some chlorinated hydrocarbons are well known carcinogens). This is why numerous places have switched from chlorine to chlorine dioxide as a disinfectant in municipal water treatment. The first application was odor control in municipal water at Niagara Falls, N.Y. already in the forties of the last century.

Chlorine dioxide achieves its selective biocide effect by inactivating key membrane proteins. The inactivation is caused by a change in the spatial structure of these proteins. This is because the secondary and tertiary structures of the proteins are stabilized by disulfide bonds and when chlorine dioxide reacts with these bonds it modifies the structure and inactivates the proteins this way.

Beside disinfection chlorine dioxide is used in the paper and pulp and also in the textile industries for bleaching. The greatest consumer is the paper and pulp industry where plants capable to produce even 50 tons of chlorine dioxide per day are under construction.

Transportation Problems Connected with Chlorine Dioxide

It is a major obstacle for the rapid spread of various chlorine dioxide applications that the gas has to be generated on the spot of the utilization. This is because chlorine dioxide—unlike chlorine—cannot be stored in gas cylinders and consequently cannot be transported in such a form, as pure gaseous chlorine dioxide or any gaseous mixture containing more than 10% (especially between 25 and 30% (volume/volume)) chlorine dioxide can decompose rapidly. In this exothermic reaction which is initiated by light chlorine dioxide decomposes to gaseous chlorine and oxygen:

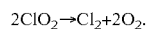

$$2ClO_2 \rightarrow Cl_2 + 2O_2.$$

However, the above reaction, accompanied by a rapid increase of the volume, is not a real explosion as the velocity of the reaction wave stays below 1 m/s, while the velocity of real detonation waves starts at 300 m/s. Thus to make a distinction the usual terminology in the literature for this rapid decomposition is "puff". While such a puff can be easily avoided with due care, this does not modify the fact that chlorine dioxide cannot be stored in gas cylinders thus it has to be generated on the spot anyway.

Various Methods of Chlorine Dioxide Production

Production of Chlorine Dioxide from a Chlorate by Reduction

The oxidation number of chlorine in chlorine dioxide ($ClO_2$) is 4. Chlorine dioxide has an unpaired electron in other words it is a free radical; its specific reactions and also its greenish yellow color is due to this fact. The large quantities of chlorine dioxide used by the paper and cellulose industry are produced by the one electron reduction of chlorate (where the oxidation number of chlorine is 5) in acidic media:

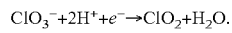

$$ClO_3^- + 2H^+ + e^- \rightarrow ClO_2 + H_2O.$$

The reducing agent can be sulfur dioxide, methanol, or most recently hydrogen peroxide. In the latter case oxygen gas is also produced in the reaction:

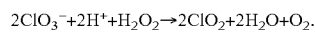

$$2ClO_3^- + 2H^+ + H_2O_2 \rightarrow 2ClO_2 + 2H_2O + O_2.$$

Usually the sodium salt of the chlorate ion and sulfuric acid is used in the manufacturing process. To obtain a relatively clean aqueous solution of $ClO_2$ the produced chlorine dioxide together with the oxygen and a part of the solvent is evaporated first, then it is re-dissolved in water in absorption towers. Such a process and apparatus for producing chlorine dioxide is disclosed in WO 2006/062455 by EKA Chemicals AB. The alkali metal sulfate formed in the reaction is normally withdrawn preferably as a solid salt cake. On the other hand, if an acid or salt contamination does not disturb the further use of the aqueous chlorine dioxide solution then the energy-demanding evaporation and the equipment-demanding absorption steps of the technology can be left out and the product solution can be simply diluted with water. Such technologies are disclosed in WO 03/000586 and WO 2006/062456 by EKA.

While among the possible starting materials of the chlorine dioxide synthesis it is the chlorate which is the least expensive one, such a technology can be applied economically only when the chlorine dioxide demand is at least several tons per day because of the expensive equipment. In the case of smaller chlorine dioxide demand chlorine dioxide is produced from some alkali—usually sodium—chlorite as starting material. It should be mentioned that sodium chlorite itself is produced from chlorine dioxide by reducing that with hydrogen peroxide in alkaline media (see e.g. Kirk-Othmer Encyclopedia of Chemical Technology 3rd edition). This way a safe transport of chlorine dioxide can be carried out in the form of chlorite.

Production of Chlorine Dioxide from a Chlorite by Oxidation

If larger amounts of chlorine dioxide are needed (but the daily consumption stays below one ton), then usually various chlorine dioxide generators are applied, which generate chlorine dioxide by a one electron oxidation of chlorite (a compound where the oxidation number of chlorine is 3):

$$ClO_2^- \rightarrow ClO_2 + e^-.$$

The oxidizing agent is often chlorine according to the following stoichiometry:

$$2ClO_2^- + Cl_2 \rightarrow 2ClO_2 + 2Cl^-.$$

Most of the chlorine dioxide generators apply this reaction; see for example U.S. Pat. No. 5,009,875 of International Dioxide. Recently the direct anodic electrochemical oxidation is also applied. An advantage of this method is that the rate of the chlorine dioxide evolution can be directly controlled by the electric current. U.S. Pat. No. 4,683,039 of ERCO describes such an apparatus where the anodic oxidation is combined with the pervaporation of the evolving chlorine dioxide. The pervaporation takes place across a hydrophobic porous polytetrafluoro ethylene membrane, the pores of which cannot be penetrated by the liquid, thus in theory only the gaseous chlorine dioxide could diffuse through these pores. According to the measurements (ERCO R101™ Technology), however, the selectivity is less than 100% and a small amount of chlorite and chlorate can also penetrate through the porous membrane. Most probably this is due to the fact that in some pores a liquid phase diffusion also takes place.

Independently of the method of generation the use of the complicated and relatively expensive chlorine dioxide generators is economic only if the chlorine dioxide demand is large enough, in the case of municipal water treatment, for example.

Production of Chlorine Dioxide Via the Reaction of Chlorite with Various Acids

Various other applications require only smaller amounts of chlorine dioxide and the use of generators is not economic in such cases. (Preparation of aqueous disinfecting solutions, sterilization of medical and dental equipments, washing of fruits are examples for applications demanding relatively small amounts of chlorine dioxide.) In that case the disproportionation reaction of chlorous acid is applied which is the easiest to realize simply by acidifying an aqueous chlorite solution. In the optimum case this reaction yields 4 chlorine dioxide molecules from 5 chlorite ions:

$$5ClO_2^- + 4H^+ \rightarrow 4ClO_2 + Cl^- + 2H_2O.$$

Beside various strong inorganic acids the mild acidic medium required for the disproportionation reaction can be realized with certain organic acids as well. The application of the latter can be advantageous because of their less corrosive character. Such an organic acid is citric acid for example, which is used widely for this purpose. While patent descriptions mention usually the above $5\ ClO_2^- \rightarrow 4\ ClO_2$ stoichiometry alone, that optimum stoichiometry is valid only when the reagent is hydrochloric acid applied in excess. In the case of other acids the following stoichiometry holds (Gordon and Kiefer Inorg. Chem. 1968, 7, 235):

$$4ClO_2^- + 2H^+ \rightarrow 2ClO_2 + Cl^- + ClO_3^- + H_2O.$$

This means on one side that the final product will be contaminated by chlorate and on the other side that the maximum yield of chlorine dioxide is limited to 62.5% compared to the optimum stoichiometry with hydrochloric acid.

According to the simplest technology aqueous solution of sodium chlorite and of an organic acid is mixed (U.S. Pat. No. 6,007,772) producing this way a cold sterilant solution. The chlorine dioxide solution produced with this method is corrosive, however, because of its acidic pH and its chloride ion content. We remark here that a pure aqueous chlorine dioxide solution is not corrosive, however. Consequently the above solution can be used to disinfect or sterilize metal parts only in a combination with various corrosion inhibitors depending on the metal to decrease its corrosion. U.S. Pat. No. 6,007,772 discusses these corrosion-inhibiting agents in detail.

A continuous production of aqueous chlorine dioxide solution is also possible by mixing flows of sodium chlorite and citric acid solutions in a tubular reactor. The concentrated chlorine dioxide solution leaving the reactor is diluted by a continuous flow of water (WO 2005/011759). The chlorine dioxide solution produced this way can be used advantageously e.g. for skin asepsis or even wound irrigation and disinfection because, as that patent emphasizes, chlorine dioxide is well tolerated by humans and animals.

It is a disadvantage of the method described in the previous paragraph that the $ClO_2$ solution produced this way also contains some non-reacted $NaClO_2$, citric acid, sodium citrate, $NaClO_3$, and $NaCl$. Such a contamination is always a problem especially if the aim is to produce a more concentrated $ClO_2$ solution because in that case the concentration of the contaminating components would be also higher in the final solution. $ClO_2$ can be separated from the contaminating components by stripping it with a gas (WO 2006/020704). A subsequent absorption of the stripped $ClO_2$ in water can yield a chlorine dioxide solution which is relatively free of contaminants. Such a method is capable to produce larger amounts of chlorine dioxide containing water by applying aqueous solutions of sodium chlorite and various organic acids. To decrease the costs usually a mixture of lactic and acetic acids is used. A main disadvantage of this method—beside a low level contamination of the final product caused by small droplets traveling with the stripping gas—is the need for stripping and absorbing towers, that these devices should be operated with recirculation, moreover that to reach a higher efficiency two stripping and two absorption towers should be connected in series.

Production of Chlorine Dioxide with Disposable Devices

For an on-the-spot generation of small chlorine dioxide amounts various methods were developed applying disposable devices. There are two main groups of these methods: the aim in first group is to produce chlorine dioxide in the form of an aqueous solution, while in the second group the aim is to generate gaseous chlorine dioxide. Presently all the known methods apply the chlorite—acid reaction for the chlorine dioxide generation.

A) Production of Aqueous Chlorine Dioxide Solutions with Disposable Devices

These procedures do not use solutions but solid reagents instead, in various forms aiming to simplify the application. It is worth to mention two of such procedures:

i) The first method applies reagent pellets. U.S. Pat. No. 6,432,322 by ENGELHARD describes such a method. The main components of their tablet (the commercial name is ASEPTOL) are solid sodium chlorite, sodium hydrogen sulfate and calcium chloride. (Beside these components the pellet also contains various other additives but the major function of the tablet can be understood without those.) In the absence of water the above mentioned solid reagents cannot participate in reactions. When the pellet is placed into water, however, the components start to dissolve and react with each other. In the acidic medium (created by the dissolving sodium hydrogen sulfate) chlorine dioxide evolution starts resulting in an aqueous chlorine dioxide solution. It is important that a formation of calcium sulfate and calcium hydrogen sulfate precipitates also takes place simultaneously thus the tablets containing the reagents will not dissolve entirely. This ensures that the acidic disproportionation of chlorite takes place mostly in the pores of the slowly dissolving tablet. It cannot be avoided, however, that the solution be contaminated by more or less sodium hydrogen sulfate or calcium chloride (depending on which component was applied in an excess) and also with some unreacted chlorite. Moreover the end-product chloride ions—together with sodium or hydrogen counter ions—also diffuse out of the pores of the tablet and contaminate the solution.

All these salts and acids are more or less corrosive components. It is obvious that a method generating no corrosive components and avoiding the loss of sodium chlorite would be more desirable.

ii) The second method applies various reagent-containing envelopes or sachets. One of these technologies is patented by Selective Micro Technologies: U.S. Pat. Nos. 6,602,466 and 6,607,696 (a demo can be seen at http://www.selectivemicro.com/ Sep. 15, 2006). The commercial name of the product is SELECTROCIDE. This technology applies a system of hydrophilic and hydrophobic sachets to store the reagents. For example one embodiment (the above mentioned U.S. patents describe several other sachet combinations) applies an outer hydrophobic envelope (4 cm×6 cm) which is perforated (diameter of the holes: 0.4 mm, 6.4% perforated area). Within the outer envelope there is smaller (3 cm×3 cm) sachet made of a hydrophilic membrane (with a pore size of 0.65 micron for example). The sachet contains the solid reagents (e.g. a mixture of 50 mg sodium chlorite and 200 mg citric acid). As the envelope and the sachets are made of polymeric foils, they can be sealed by fusing these foils around the perimeter. When the envelope is submerged in water, the water can flow into the envelope via the 0.4 mm diameter holes and wets the inner hydrophilic membrane. Next the water permeates through the hydrophilic membrane and the solid reagents get wet also starting the reaction this way. As the inner sachet maintains a high reagent concentration inside the sachet the chlorine dioxide production is relatively fast there. The produced chlorine dioxide permeates first across the hydrophilic membrane then through the holes of the perforated hydrophobic membrane. If this system is placed into 1 l water the final chlorine dioxide concentration is reached after half or one hour depending on the construction. While the reagent concentrations are rather high within the sachet the conversion is still far from complete.

Chlorine dioxide is not the only component, however, which can permeate through the hydrophilic membrane. Citric acid and citrate ions, the non-reacted chlorite and the end-product chloride ions are also small molecules or ions which are able to permeate. They can also get through the small holes of the outer hydrophobic envelope especially when the whole device is taken out of the water as the fluid flow helps transport across these holes. All of this means that the water will contain not only chlorine dioxide but also a small amount of sodium chloride, chlorite, chlorate, citrate and citric acid.

Another method applying an envelope is described in WO 02/00332. Here the dry reagents are surrounded by a porous hydrophobic (in some cases hydrophilic) membrane which is impermeable or only partially permeable for a liquid flow. The reaction is initiated by water drawn into the device with the help of a wick.

It is a common disadvantage of the methods applying either pellets or sachets that the aqueous chlorine dioxide solution produced by these methods will be contaminated by other materials as well. Another drawback of these methods is that because of the gradual dissolution and dilution of the reagents even the 62.5% yield cannot be achieved and to reach even a low final yield requires longer waiting periods. Finally it is also a problem that the exhausted tablets and envelopes form a waste which should be handled in some way.

B) Production of Gaseous Chlorine Dioxide with Disposable Devices

In this case the known methods apply envelopes and solid reagents exclusively. For example U.S. Pat. No. 6,676,850 by Engelhard describes such a device emitting gaseous chlorine dioxide directly to the surrounding atmosphere. The reagents—solid sodium chlorite and an inorganic ion exchanger in its hydrogen form—are mixed and placed into an air permeable plastic bag. The reaction is initiated by the humidity of the air. The sachet construction of Selective Micro Technologies can be also applied to generate gaseous chlorine dioxide: here solid citric acid can play the role of the aforementioned inorganic ion exchanger.

WO 2004/030454 describes another construction applying sachets where the device is activated by the rupture of a membrane permitting a contact between the reaction components e.g. between liquid water and some solid reagents. A common problem of these constructions that the rate of the chlorine dioxide evolution cannot be controlled after starting the reaction, moreover, this rate may depend on the reaction time and the humidity of the air as well. Thus to construct a generator maintaining a constant chlorine dioxide level in a continuous air stream with the aforementioned envelopes or sachets would be a very difficult task, at least.

The drawbacks of the above described state of the art methods can be summarized as follows.

A) Production of Aqueous Chlorine Dioxide Solutions

A common serious problem of all known methods is the separation of the product from the starting materials. There is either no separation, or the separation is not perfect or it is an equipment and energy demanding process. Regarding the chemical reaction which generates the $ClO_2$ there are 3 larger groups of the various production methods:

i) Reduction of chlorate. In the case of $ClO_2$ production methods starting from chlorate a separation of the end-product is achieved by evaporating $ClO_2$ from the reaction mixture at sub-atmospheric pressures, and the gaseous $ClO_2$ is absorbed in a water stream (see e.g. WO 2006/062455). This equipment and energy consuming separation procedure increases the costs of the production, thus it is often skipped (e.g. WO 2006/062456). In that case, however, the produced $ClO_2$ solution is contaminated by a mixture of various salts and acids, and residual reducing agent.

ii) Oxidation of chlorite. Chlorine gas utilizing $ClO_2$ generators can be also applied to produce aqueous chlorine dioxide solutions (e.g. U.S. Pat. No. 5,009,875). The aqueous chlorine dioxide solution produced this way, however, is contaminated by the end product NaCl and some unreacted chlorine or $NaClO_2$. The procedure, which combines the electrochemical oxidation of chlorite with the pervaporation of chlorine dioxide (U.S. Pat. No. 4,683,039) cannot provide a chlorine dioxide solution which is entirely free of contaminants either, in spite of the expensive porous membrane applied in that procedure.

iii) The reaction of chlorite with an acid. The yield of this reaction can approach the theoretical maximum of 4 $ClO_2$ produced from 5 $NaClO_2$ only in the case of hydrochloric acid, the corrosive properties of which, however, limit its use. Instead of HCl organic acids can be also applied (e.g. citric or lactic acid) in various continuous (e.g. WO 2005/011759) and batch procedures applying pellets (e.g. U.S. Pat. No. 6,432, 322), or sachets (e.g. U.S. Pat. No. 6,432,322). Nevertheless it is a common problem of all these methods that the $ClO_2$ yield is lower in the case of organic acids and usually they are not able to reach even this lower limit either. Moreover, contamination is also a problem here and to get rid of these contaminants requires costly equipments and time and energy consuming procedures (see e.g. WO 2006/020704).

B) Production of Chlorine Dioxide Containing Atmospheres

In these methods contaminants do not represent a serious problem as they are not volatile except chlorine. A common drawback of these methods is, however, that after activating such a gaseous chlorine dioxide producing device it is difficult or impossible to control the rate of the $ClO_2$ production. Further, gaseous $ClO_2$ is more difficult to handle, consequently the application of gaseous products is rather limited compared to $ClO_2$ containing solutions.

AIM OF THE INVENTION

An aim of the present invention is to eliminate all the drawbacks discussed in the previous paragraphs by applying chlorine dioxide producing reactors with walls which are selectively permeable for $ClO_2$, or by applying selective permeators connected to the reactors. The selectively permeable walls should not allow the transport of any component from the reactor to the target medium except chlorine dioxide, and the walls should also prevent a mixing of the target medium with the reagents inside the reactor. The target medium can be a gas, mostly air, or a liquid, mostly water, or some aqueous solution or some biological system. The selectivity is advantageous because this way the target medium is not contaminated by corrosive components and it is also advantageous regarding possible biological applications. Moreover, avoiding a mixing of the reactants with the target medium can increase the $ClO_2$ yield.

It is also an aim of the invention that the new technique be applicable both in batch and in continuous operation modes, be well controllable both in small and large scale $ClO_2$ productions starting either from chlorite or chlorate, and in addition, the technique should also create a possibility for an inflow of small chlorine dioxide amounts focusing onto a limited region of the target medium (when we want to limit the chlorine dioxide treatment to a certain small area). For the latter purpose the development of inexpensive disposable microreactors is also an alternative, but the general aim is to construct durable reactors with the new technique.

SUMMARY OF THE INVENTION

The basis of the invention is the discovery that while the permeability of certain pore free polymeric membranes, especially silicon rubber (crosslinked polyorganosiloxanes, mostly polydimethylsiloxanes) and silicon rubber composite membranes for chlorine dioxide is very high, their permeability for ionic and other water soluble components is usually very low, some times below the detection limit. Thus the inventive idea was to build a reactor or connect a permeator to a reactor the wall of which is made partly or entirely of silicon rubber, then across this wall a relatively fast and highly selective transport of the chlorine dioxide produced in the reactor can be established to the target medium, which can be any stagnant or moving fluid, or a biological or any other system to be disinfected.

In these permeation reactors we can apply even such corrosive reagents like hydrochloric acid for example (which is better than other acids regarding the $ClO_2$ yield and the rate of the reaction) without contaminating the target medium with these reagents. The reagents can be fed into the reactor in the form of aqueous solutions or can be placed there in the form of reagent containing hydrogels. As the permeable wall separates the reagents from the target medium they cannot be mixed and the target medium will not be diluted, thus the conversion can approach the theoretical maximum. A further advantage is that a $ClO_2$ "puff" can be avoided even at higher reagent concentrations because chlorine dioxide is formed in a liquid phase (where a "puff" can occur less easily) then permeates rapidly into the target fluid where its concentration is much lower. It is a major advantage that the production of a clean chlorine dioxide does not require its evaporation, and that its permeation is driven by a natural concentration gradient, as this way the process does not need energy input and requires a relatively simple equipment only.

The invention presents such reactors coupled with permeation. The reactors differ from each other depending on the ultimate purpose of the $ClO_2$ usage. Some of the embodiments presented here are aiming the production of small amounts of chlorine dioxide and are simple batch reactors because these constructions can be satisfactory in many applications. Some important advantages of the permeation technique can be realized, however, in continuously working tubular reactors only, where e.g. a close to ideal conversion can be achieved by recirculation of the partially exhausted reagents. A further advantage of the silicon rubber material is, that this material is commercially available in the form of various tubings and sheets, moreover oligomeric pastes and glues are also available which can be polymerized to various forms. All of these facilitate the construction of reactors with variable forms.

DETAILED DESCRIPTION OF THE INVENTION

The invention relates to a method for preparing fluids, that is liquids and gases, containing pure chlorine dioxide which is substantially not contaminated with the starting materials or with the byproducts of the chlorine dioxide synthesis, wherein the chlorine dioxide generated in any process is transported across a pore free polymeric membrane (in the following also referred to as "membrane") via selective permeation into the fluid target medium, which can be liquid or gas or any other medium which dissolves chlorine dioxide. In another aspect, the inventive method is also a method for delivering pure chlorine dioxide into any fluid medium, which is capable of dissolving chlorine dioxide, wherein the chlorine dioxide generated in any process is transported across a pore free polymeric membrane via selective permeation into the fluid target medium, which can be liquid or gas or any other medium which dissolves chlorine dioxide.

The pore free polymeric membrane is a material being highly permeable to chlorine dioxide, meaning that $\alpha \cdot D > 10^{-6}$ $cm^2/s$, where $\alpha$ is the distribution coefficient of chlorine dioxide between the material of the membrane and the aqueous phase and D is the diffusivity of chlorine dioxide in the material of the membrane, and at the same time the material of the membrane is less permeable for the starting materials and the byproducts of chlorine dioxide synthesis—that is for the contaminating components—at least by 3 orders of magnitude compared to chlorine dioxide, that is $\alpha_i \cdot D_i < 10^{-9}$ cm$^2$/s for any contaminating component, where $\alpha_i$ is the distribution coefficient of the i-th contaminating component between the membrane material and aqueous phase and $D_i$ is its diffusivity in the material of the membrane.

Preferably, the material used in the pore free polymeric membrane is a silicone rubber, that is a cross-linked polyorganosiloxane, preferably a crosslinked poly(dimethylsiloxane) or a silicone based composite rubber containing other auxiliary components besides the silicone compounds.

The person skilled in the art recognizes that many different types of silicone rubbers can be used. For further details reference is made to Kirk-Othmer Encyclopedia of Chemical Technology (Third edition, Wiley, New York 1982) or to Römpp's Chemie-Lexikon (Müszaki Könyvkiadó, Budapest, 1984). It is generally known for the person skilled in art that the organo group in the siloxane can be e.g. methyl, ethyl, phenyl, trifluoropropyl etc. The silicone can be filled with different auxiliaries, e.g. by titanium dioxide, aerosol, iron-oxide etc. For using as a membrane material, a reinforcing, e.g. fiber reinforcing or web reinforcing (textile or other fibers) can be preferably used.

The above methods of the invention do not depend on the chemical process for preparing chlorine dioxide itself; it can be any industrially applicable process, i.e. those known processes referred to in the "Background of the invention" section above. One particularly useful process for preparing chlorine dioxide is, wherein the chlorine dioxide is generated by mixing solutions of an alkali chlorite, preferably sodium chlorite, and an inorganic acid, preferably hydrochloric acid or an organic acid, preferably lactic or citric acid in a batch or in a continuously fed stirred tank reactor. Another useful process for preparing chlorine dioxide is, wherein the chlorine dioxide generating reaction is the oxidation of an aqueous solution of an alkali chlorite, preferably sodium chlorite by chlorine or any other oxidizing agent or by electrochemical means in a batch or in a continuously fed stirred tank reactor.

Still another useful process for preparing chlorine dioxide is, wherein the chlorine dioxide generating reaction is the reduction of an aqueous solution of an alkali chlorate, preferably sodium chlorate in a batch or in a continuously fed stirred tank reactor by methanol, hydrogen peroxide or by any other reducing agent or by electrochemical means.

In the above recited three methods a continuous flow of the target medium, which is some kind of fluid (further on: fluid target medium), is maintained by a delivery pump or by any other means, and in the case of continuous chlorine dioxide production a countercurrent flow of the target medium and of the reagents can be applied.

In one embodiment using the above cited processes for preparing chlorine dioxide, two components of the chlorine dioxide generating reaction are delivered into a batch reactor being dissolved in separate hydrogel pieces where due to the contact of the two hydrogels and the diffusion of the two components, chlorine dioxide is produced and transported from the reactor through the membrane into the fluid target medium.

In another embodiment the components of the chlorine dioxide generating reaction are mixed outside the reactor and the mixture is loaded into the closed reactor by a piston (which can also be e.g. a syringe in small scale production) through an appropriate injector or needle, while with the aid of e.g. another piston the air is removed from the reactor, where after the filling chlorine dioxide is produced in a fast reaction and transported from the reactor through the membrane into the fluid target medium.

In another embodiment, especially for producing larger amounts of aqueous chlorine dioxide solutions, the reagents necessary for the chlorine dioxide production are pumped into a mixing chamber, then conducted through a re-circulated permeator-reactor in such a way that a larger part of the stream of the used reagents leaving the reactor is re-circulated into the mixing chamber causing an intense mixing of the used and fresh reagents there, and a smaller part of the used reagent flow leaving the reactor is conducted through a smaller auxiliary permeator-reactor where the evolving chlorine dioxide permeates into a flow of water which is conducted first through the auxiliary permeator-reactor and then through the larger permeator-reactor always in a countercurrent direction with respect to the flow of the reactants.

The invention also relates to different apparatuses for producing chlorine dioxide, which have a particularly useful arrangement for different scla of produced quantities.

In the first embodiment the apparatus is a reactor where some or all walls comprising the reactor, or the walls of a permeator unit attached to the reactor, are made of a pore free polymeric membrane, the material of which is highly permeable to chlorine dioxide, meaning that $\alpha \cdot D > 10^{-6}$ cm$^2$/s, where $\alpha$ is the distribution coefficient of chlorine dioxide between the material of the membrane and the aqueous phase and D is the diffusivity of chlorine dioxide in the material of the membrane, and at the same time the material of the membrane is less permeable for the starting materials and the byproducts of chlorine dioxide synthesis—that is for the contaminating components—at least by 3 orders of magnitude compared to chlorine dioxide, that is $\alpha_i \cdot D_i < 10^{-9}$ cm$^2$/s for any contaminating component, where $\alpha_i$ is the distribution coefficient of the i-th contaminating component between the membrane material and aqueous phase and $D_i$ is its diffusivity in the material of the membrane.

The material of the pore free membrane is preferably a silicone rubber, that is cross-linked polyorganosiloxane, more preferably poly(dimethylsiloxane) or a silicone based composite material containing other auxiliary components besides the silicone compounds, commonly aerosol, titanium-dioxide or iron-oxide. It is preferred that the permeator or the permeator-reactor (i.e. a unit playing the role of a reactor and permeator in itself), within which the chlorine dioxide producing reaction is carried out is a silicon rubber tubing or tube bundle, which consists of several silicon rubber tubes connected in parallel, surrounded by the target fluid where the produced chlorine dioxide permeates to.

In the second embodiment the apparatus depicted on FIGS. 3a and 3b comprises:
- a batch type tubular permeator-reactor (31) surrounded by the fluid target medium, preferably by water;
- a tubing (32) which is impermeable for chlorine dioxide;
- a closed container (33) filled with the fluid target medium, preferably water;
- a stirrer (34), preferably a magnetic stirrer bar to stir the medium;
- a piston (35) containing the first reactant or first reactant mixture;
- a piston (36) containing the second reactant or second reactant mixture;
- a device (37) ensuring a synchronous motion of the two pistons;

wherein the synchronous motion of the two pistons delivers the two reactants or reactant mixtures into the tubular permeator reactor to form a reaction mixture there generating chlorine dioxide, which permeates through the wall of the reactor into the fluid target phase, preferably water mixed continuously by the stirrer.

As it comes from the above disclosed chemical reactions for producing $ClO_2$, the first and second reactants can be—if required—mixtures of one or more reactants with one or more solvents.

Figure 5:
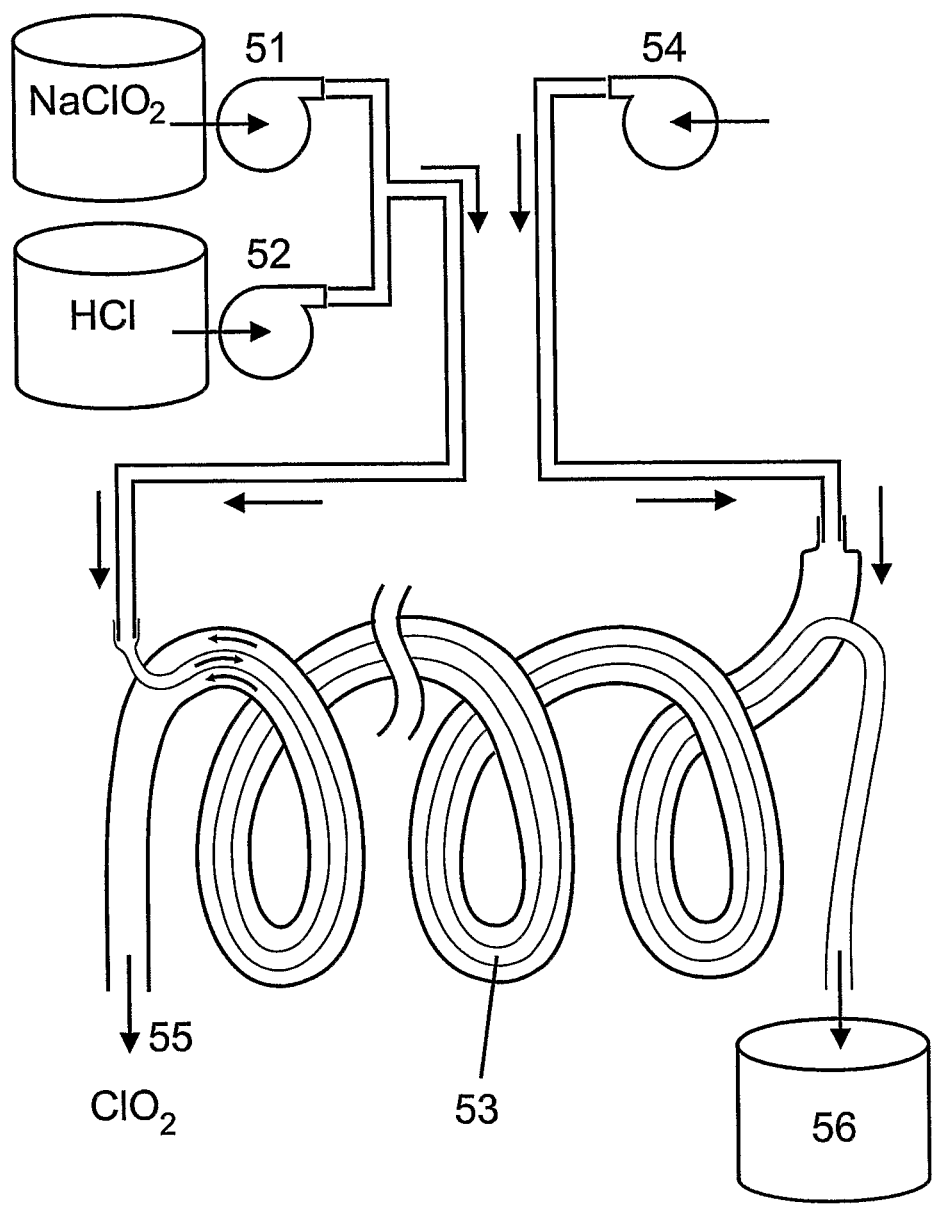

In the third embodiment the apparatus depicted on FIG. 5 comprises:
- a pump (51) delivering the first reactant or first reactant mixture;
- a pump (52) delivering the second reactant or second reactant mixture;
- a tubular permeator-reactor (53);
- a pump (54) delivering the fluid target medium, preferably water or air;
- an outflow (55) for the fluid containing substantially pure chlorine dioxide,
- a reservoir (56) to store the exhausted reaction mixture;

wherein the reactants fed by the pumps are mixed continuously in the appropriate molar ratio to produce chlorine dioxide, which permeates through the wall of the permeator-reactor into the countercurrent flow of the fluid target medium.

As it comes from the above disclosed chemical reactions for producing $ClO_2$, the first and second reactants can be—if required—mixtures of one or more reactants with one or more solvents.

Figure 6A:
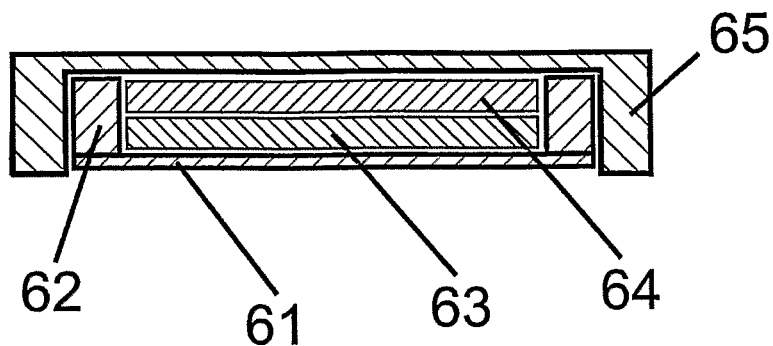

In the third embodiment the apparatus depicted on FIGS. 6a) and 6b) comprises:
- a reinforced pore free polymeric membrane (61), preferably reinforced silicone rubber membrane the thickness of which is preferably 0.1 to 1 mm;
- a gasket ring (62) adhered to the said membrane, preferably made of silicone;
- a hydrogel disk (63) containing the first reactant;
- a hydrogel disk (64) containing the second reactant;
- a cap (65) closing the upper part of the permeator-reactor which is made of a material, which is impermeable for chlorine dioxide;

wherein the two reactants react in a diffusion limited reaction within the two contacting hydrogels and the slowly produced chlorine dioxide leaves the permeator-reactor by diffusing first through the hydrogels and then the pore free polymeric membrane. The material of the cap can be e.g. a (soft) PVC material.

Figure 7A:
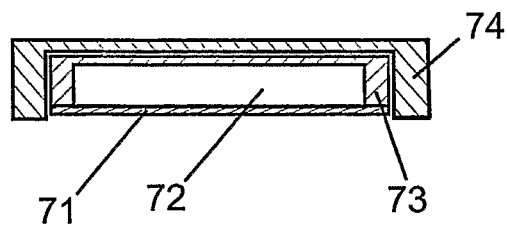
Figure 7B:
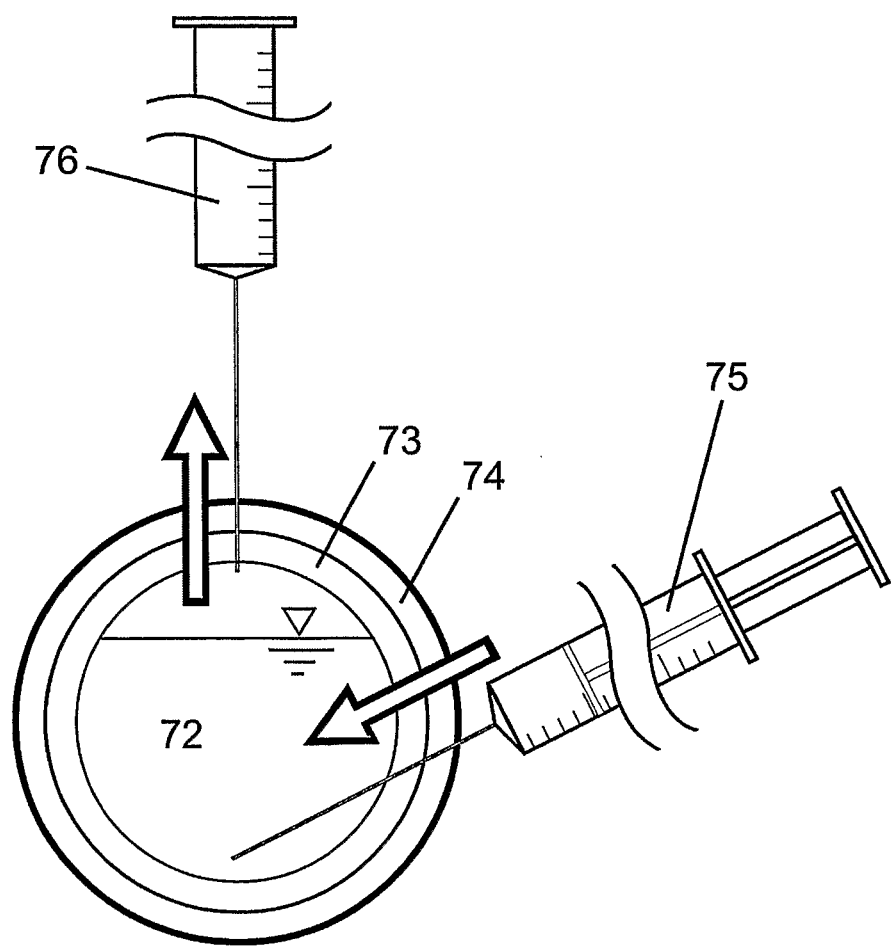

In the third embodiment the apparatus depicted on FIGS. 7a and 7b comprises:
- a reinforced pore free polymeric membrane (71), preferably reinforced silicone rubber membrane the thickness of which is preferably a few tenths of a millimeter;
- a sealing piece (73) adhered to said membrane, the two forming a closed container;
- reagent mixture (72) in the closed container;
- a cap (74) closing the upper part of the permeator-reactor which is made of a material, which is impermeable for chlorine dioxide, wherein the chlorine dioxide leaves the reactor by permeating through the said membrane into the target medium. The material impermeable for chlorine dioxide can be e.g. a soft PVC material;

Reactants can be charged according to FIG. 7b by any known means into the reactor, e.g. by a needle syringes (75) and (76) in small scale production as well, where the appropriate injection volume can be easily metered via the syringe.

Figure 8:
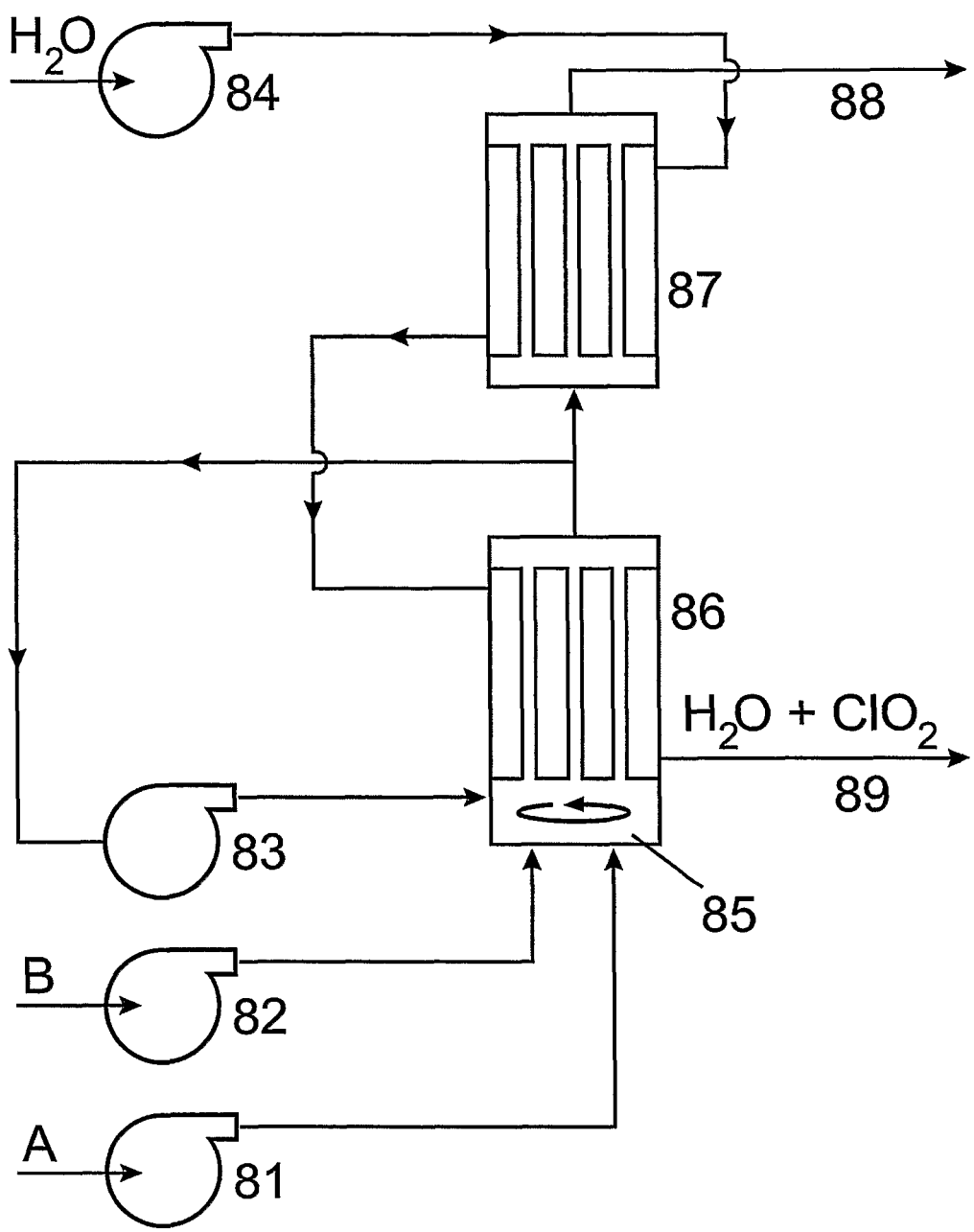

In the third embodiment the apparatus depicted on FIG. 8 comprises:
- a pump (81) delivering reagent (A) necessary for the chlorine dioxide production;
- a pump (82) delivering reagent (B) necessary for the chlorine dioxide production;
- an optional pump (83) for re-circulating the not completely exhausted reagent stream;
- a pump (84) providing a stream of the fluid target medium, preferably water or air;
- a mixing chamber (85);
- a first permeator-reactor (86);
- an auxiliary permeator-reactor (87);
- an outflow for the exhausted reaction mixture (88);
- an outflow for the product stream (89) containing pure chlorine dioxide;

wherein both permeator reactors contain plate and frame or tube bundle type permeating membranes of large surface areas to provide a high output and a recirculation of the reagents is applied to achieve a better yield.

Concerning the specific apparatus, the person skilled in the art will recognize, that although using e.g. a batch reactor or a continuous stirred tank reactor (CSTR), which are well known in chemical engineering, is beneficial, other types of reaction vessels can be contemplated as well, like continuos tubular reactors. It is also well known for a person skilled in the art how the heating/cooling of the reactor wessel shall be constructed, e.g. by means of a built-in or an external heat exchanger (e.g. heating/cooling coil) or by using a jacketed reactors with e.g an external simple cooling jacket or an external (half) coil jacket. The reactors can be usually fabricated in steel, stainless steel, glass or Teflon lined steel or glass. Known agitator arrangements can be used in the reactor, e.g. a magnetic stirrer bar, a centrally mounted impeller blades. Most batch reactors also use baffles. Further details for reactor design can be found e.g. Kirk-Othmer Encyclopedia of Chemical Technology, Third edition, Wiley, N.Y. 1982.

FIGURES

FIG. 1 shows the experimental apparatus used to determine the diffusion coefficient D of chlorine dioxide in commercial silicon rubber and its distribution coefficient $\alpha$ between silicon rubber and aqueous phases.

Figure 2A:
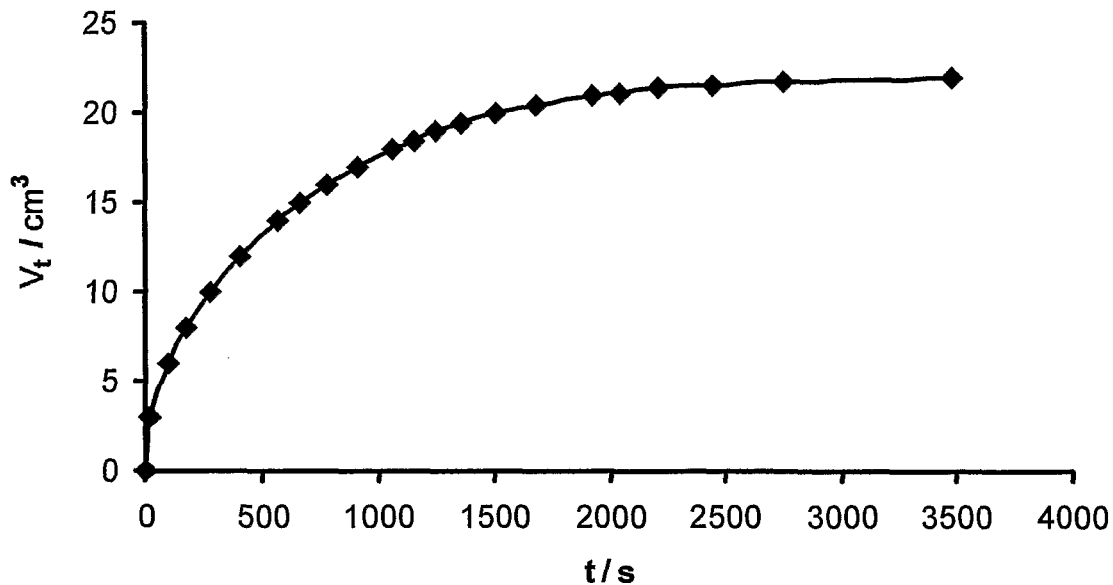
Figure 2B:
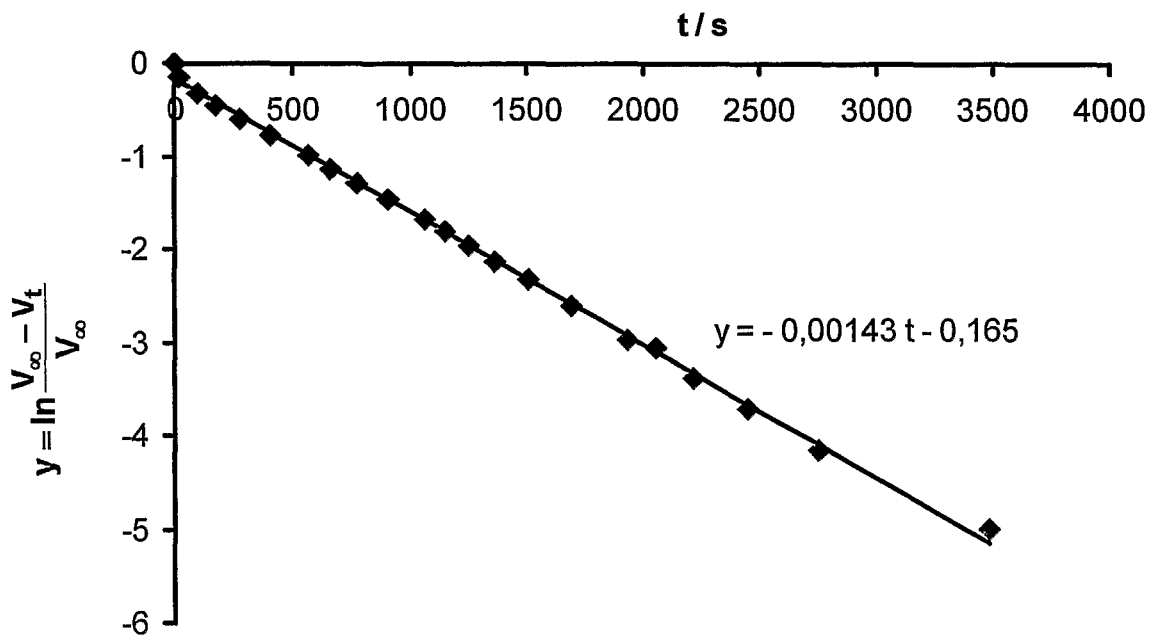

FIG. 2 displays experimental curves measured with the apparatus shown in FIG. 1. D and $\alpha$ can be calculated from these curves.

FIG. 3 shows a batch type tubular permeation reactor (a), together with the device (b) applied to fill up that reactor.

Figure 4:
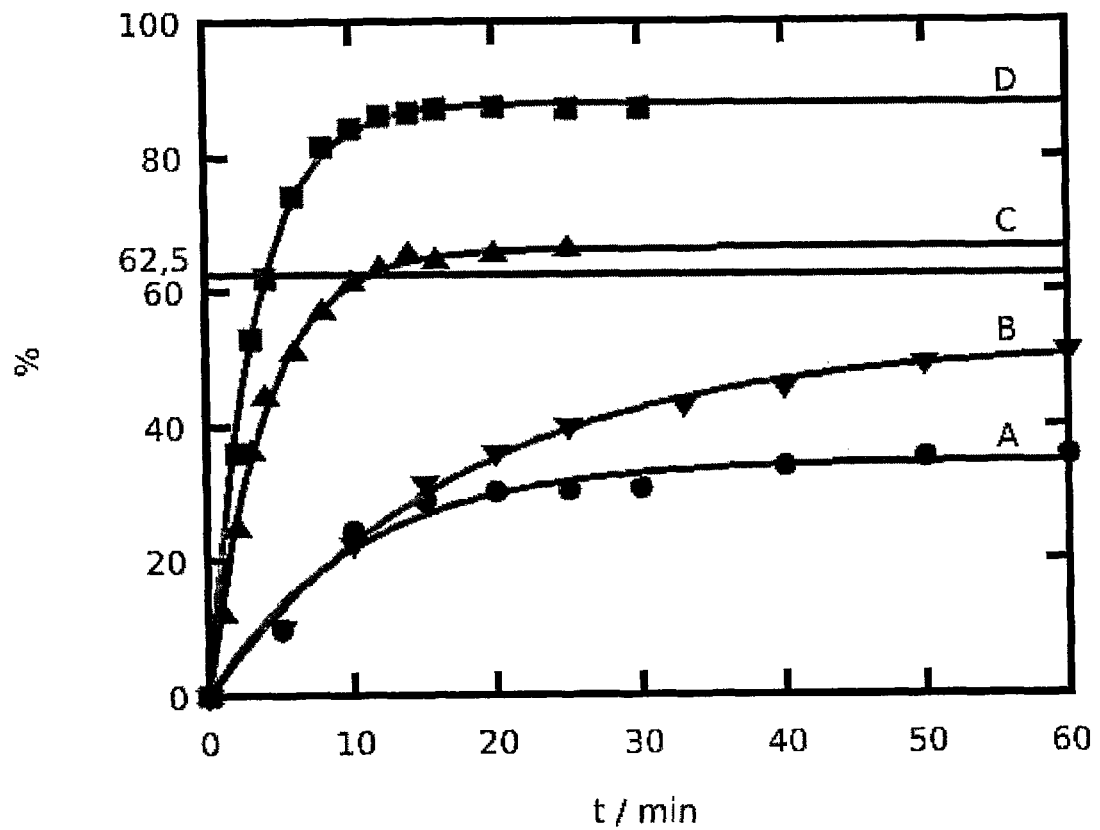

FIG. 4 displays the percentage yield of $ClO_2$ measured as a function of time at four different chemical compositions (denoted by A, B, C, and D, see text). The percentage yield means the percentage of the maximum achievable conversion.

FIG. 5 depicts a counter-current flow tubular permeation reactor.

Figure 6B:
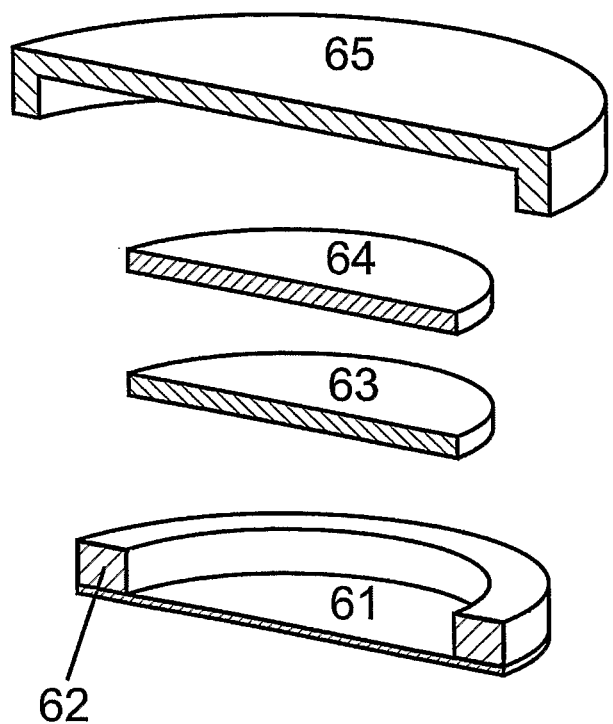

FIG. 6 shows a reactor with the help of which a focused input of chlorine dioxide can be achieved. The reagents are placed into the reactor in the form of reagent containing hydrogels. A cross-sectional view of the micro-reactor, which contains a flat membrane, can be seen in FIG. 6a. FIG. 6b shows how the reactor pieces can be joined together.

FIG. 7 displays a reactor for focused chlorine dioxide input also—similarly to the one depicted in FIG. 6. In this case, however, the reagents are introduced in a liquid form into the reactor to accelerate the $ClO_2$ formation. A cross-sectional view of the micro-reactor containing a flat membrane can be seen in FIG. 7a. FIG. 7b shows how the reactor can be filled up with a reagent mixture.

In FIG. 8 the block diagram of a high capacity apparatus can be viewed. The apparatus produces aqueous $ClO_2$ solution continuously while separating $ClO_2$ from the starting materials.

PHYSICO-CHEMICAL FOUNDATIONS OF THE INVENTION

The invention is based on the following two fundamental discoveries:
i) $ClO_2$ permeates selectively via a silicon rubber membrane and
ii) the permeability of $ClO_2$ for silicon rubber is very high compared to other polymers: the rate of $ClO_2$ permeation across a silicon rubber sheet is roughly equal to the permeation rate across a water layer of the same area and thickness. (Later on this qualitative statement will be verified by quantitative measurements.)

For a quantitative description of permeation the well known theory and formulae of gas permeation can be applied. It should be taken into account, however, that in the present case the silicon rubber membrane separates two aqueous phases or an aqueous and a gas phase, and not two gas phases. This is because the reaction generating chlorine dioxide takes place in an aqueous phase anyway. On the other hand, the target medium can be gas or liquid as well.

In the next paragraph some transport equations will be cited or derived, which are necessary to design permeation reactors consistent with the present invention on the one hand, and for the evaluation of our $ClO_2$ permeability measurements on the other hand.

Gas Permeation Across Polymer Membranes Between Two Fluid Phases

Let us regard first the simple and well known case, when a polymeric membrane of cross-section A and thickness δ separates two gaseous phases. The partial pressure of the permeable gas component we want to separate be denoted by $p_R$ in the reactor space, and by $P_T$ in the space of the target medium. The component current I permeating across the membrane can be given by the following formula (see e.g. Stern, A. S., "Polymers for gas separations: the next decade", Review, J. Membr. Sci. 1994, 94, 1):

$$I = P \cdot (A/\delta) \cdot (p_R - p_T),$$

where the permeability coefficient P is the product of the diffusion coefficient D and the solubility coefficient $S_P$ of the gas dissolved in the membrane, that is:

$$P = D \cdot S_P.$$

Now let us regard the somewhat more complex case, when both sides of the membrane are contacted not by gaseous but by liquid (in this particular case aqueous) phases instead, where components are characterized not by their partial pressure but by their concentration. Even if the membrane contacts the liquid phases only, we can assume vapour phases above these liquids, being in equilibrium with the liquid phases. It is important that the same component current I should appear across the membrane regardless whether it is in contact with the liquid or the gaseous phases because the driving force, the chemical potential difference, is the same in both cases. Thus the previous formula is still valid but we can use component concentrations instead of partial pressures applying Henry's law according to which $$c_R = S_W \cdot p_R \text{ and } c_T = S_W \cdot p_T,$$

where $S_W$ is the solubility coefficient of the permeable component in the aqueous phase. Regarding these equations the permeation current I can be written in the following form:

$$I = \alpha \cdot D \cdot (A/\delta) \cdot (c_R - c_T)$$

where $\alpha = S_P / S_W$ is the distribution coefficient of the permeable component ($ClO_2$ in our case) between the membrane phase (here: silicon rubber) and the aqueous phase.

Determination of Parameters α and D for a Commercially Available Silicon Rubber Material (FIGS. 1 and 2)

As the actual values of the parameters α and D play a crucial role in sizing of permeation reactors, but these values for chlorine dioxide permeation across commercial silicon rubber products (these are usually prepared from cross-linked poly-dimethylsiloxane with fumed silica filler material) were not known, we have determined these values with the simple apparatus shown in FIG. 1 for a commercial silicon rubber named PEMÜSIL® of the PEMÜ Co. Hungary. (That product is prepared from the raw material ELASTOSIL® R 401/60 S of the WACKER Co., which contains 35% fumed silica as filling material. This raw material—which is mostly a liquid state linear polymer containing divinyl siloxane end groups—should be cross-linked at 200-300° C. usually with various benzoyl peroxide derivatives to obtain the end-product silicon rubber. The diffusion properties of the ready made product, however, are not modified by the cross-linking or by the cross-linking agents. Most of the rubber is made of poly-dimethylsiloxane, and its transport properties deviate from the pure linear polymer only because of the filling material.)

The measurements were performed at laboratory temperature at 22±2° C. To the bottom of a commercially available glass weighing vessel 11 (which vessel could be closed hermetically with the ground glass lid 12) a PEMÜSIL® silicon-rubber disk 13 (diameter: 30.00±0.05 mm, thickness: 1.15±0.05 mm) was glued with the aid of silicon glue (WACKER Elastosil® SK-42). To achieve that the chlorine dioxide dissolved in the silicon rubber disk be able to leave the disk mainly across its top surface and not across its side, the rim of the disk was surrounded by the hard PVC collar 14. The aqueous solution 16 was stirred by the magnetic stirring bar 15.

In the glass vessel an aqueous chlorine dioxide solution was produced by adding 0.2 cm³ 1.9 M $NaClO_2$ solution drop-wise to 10 cm³ 1 M HCl solution under continuous and intense magnetic stirring. After all of the $NaClO_2$ solution was added the vessel was closed and the continuous stirring was continued for 1 hour to establish an equilibrium distribution of chlorine dioxide between the water and the silicon rubber. Then 3 parallel samples of 0.2 cm³ were taken from the aqueous phase, which were titrated with 0.01 M sodium thiosulfate solution to determine the $ClO_2$ concentration in the aqueous phase. (To this end the samples were added to a mixture of 10 cm³ water+2 cm³ 1 M $H_2SO_4$+1 cm³ 1 M potassium iodide aqueous solutions. The final phase of the titration was performed in the presence of starch indicator.) From the volume of the titrant (which was 4.66 cm³), the volume of the disk (0.82 cm³), and another volume of the titrant (22.15 cm³) needed to titrate all the chlorine dioxide diffused out of the disk the distribution coefficient α was calculated:

α=1.16±0.05. (The error of the measurement is
   mainly due to the uncertainty in the determina-
   tion of the thickness of the silicon rubber disk.)

The total amount of chlorine dioxide dissolved in the disk and the diffusion coefficient D were determined with the following method. The aqueous chlorine dioxide solution was removed from the vessel and after a fast washing with water (lasting about only 3 seconds) a mixture of 10 cm³ water, 1 cm³ potassium iodide, 3 cm³ 0.01 M sodium thiosulfate and 1 drop 5% starch solution was poured into the vessel. After this the magnetic stirring and the measurement of time had started. The time when the blue color of the triiodide-starch complex appeared was recorded, then 2 cm² 0.01 M tiosulfate was added to the mixture and we were waiting again for the appearance of the blue color. This was continued with adding decreasing amounts of thiosulfate until the point when after the addition of the last small portion of thiosulfate the blue color disappeared but had not reappeared again.

Next the volume of the titrant $V_t$ necessary to titrate the chlorine dioxide diffused out of the silicon rubber disk until time t was depicted as a function of t. From this diagram (see FIG. 2a)) the total amount of chlorine dioxide dissolved in the disk and also the diffusion coefficient of $ClO_2$ in silicone rubber can be determined. To this end the diagram of FIG. 2a) was transformed: instead of depicting $V_t$ it was $\ln[(V_\infty - V_t)/V_\infty]$ which was depicted as a function of t, where $V_\infty$ is the volume of the titrant needed after infinite time. This way we can obtain a straight line (J. Crank: The Mathematics of Diffusion 2nd ed., Clarendon, Oxford 1975) the slope of which is $-D \cdot \pi^2/(4 \cdot h^2)$, where h is the thickness of the silicon rubber disk. The intercept of the straight line should be about $-\ln(\pi^2/8)$ according to the theory. Such a diagram can be seen in FIG. 2b). The diffusion coefficient D was calculated from the slope: $D=(7.6 \pm 0.6) \times 10^{-6}$ cm²/s. (The error of the diffusion coefficient is also due to uncertainty in the determination of the thickness but its relative error is two times larger than the relative error of $\alpha$ because the formula to calculate D depends on $h^2$, while the formula to calculate $\alpha$ depends on h only.) $V_\infty$—as a first approximation—is the volume of the titrant after the addition of which the blue color cannot reappear any more. This value was 22.2 cm³ in the present case. Naturally this is an upper limit only which should be decreased somewhat if we want to achieve a best fit of the calculated points to a straight line. In the present case $V_\infty=22.15$ cm³ was the optimum.

Evaluation of the Results and Comparison with Data Known from the Literature

No data were found in the literature for the diffusion coefficient of chlorine dioxide in silicone rubber to compare with the D value presented in the previous paragraph. It can be a guideline, however, that the D value of carbon dioxide in pure poly-dimethylsiloxane is $22 \times 10^{-6}$ cm²/s at 35° C. (T. C. Merkel et al. J. Pol. Sci. B. 2000, 38, 415). This is relevant because chlorine dioxide and carbon dioxide are molecules with similar sizes. (The distance between the two oxygen atoms in carbon dioxide is 2.4 Angstrom while in chlorine dioxide this distance is 2.52 Angstrom. It is true, however, that while carbon dioxide is a linear molecule in the case of chlorine dioxide the angle between the two oxygen-chlorine bonds is not 180 but only 118 degrees.) Our estimate is based on the assumption that in the same polymer the diffusion coefficients of two molecules of nearly the same size should be nearly equal. For example in poly-dimethylsiloxane at 35° C. the diffusion coefficient of methane is $22 \times 10^{-6}$ cm²/s, which is equal to the diffusion coefficient of carbon dioxide. (One side of the tetrahedral methane molecule is 1.78 Angstrom.)

As can be seen, however, the diffusion coefficient for chlorine dioxide in silicon rubber measured by us at 22° C. is only one third of the value what we would expect at 35° C. Naturally a part of this deviation is due to the lower temperature. Nevertheless, most of the deviation is caused probably by the filling material what is always present in commercial silicon rubbers and which is absent from the measurements published in the literature.

From the above results we can make the following three conclusions:

The solubility of chlorine dioxide in a commercial silicone rubber is somewhat higher than in water, as its distribution coefficient $\alpha=1.16$.

The diffusion coefficient of chlorine dioxide in a commercial silicon rubber ($0.76 \times 10^{-5}$ cm²/s) reaches the same order of magnitude ($\approx 10^{-5}$ cm²/s) which is characteristic for molecules dissolved in water, especially because regarding the transport it is $$D^* = \alpha \cdot D = 0.88 \times 10^{-5} \text{ cm}^2/\text{s what really matters.}$$

In the case of an unfilled or a less filled silicone rubber both $\alpha$ and D would be higher.

Diffusion of Chlorine Dioxide Out of a Batch Type Tubular Reactor. Time Constant of the Process In this paragraph we are going to estimate the time while most of the chlorine dioxide leaves the tubular reactor after its production there. (In other words now we want to estimate the time constant of the transport separately.) If the concentration of chlorine dioxide in the medium surrounding the tubular reactor is negligible compared that of inside the tubular reactor then it can be proven that the inner concentration decreases exponentially, which decrease can be characterized by the time constant $\tau$ while the inner concentration decreases to a value which is e times smaller than the initial one, that is $$c(t)=c(0) \cdot \exp(-t/\tau) \text{ and } c(\tau)=c(0)/e.$$

We want to calculate this time constant $\tau$ because with the help of that we can estimate the time of the transport. For example if we wait a time period of 5□ then we know that after this time more than 99.3% of the initial chlorine dioxide has already left the reactor. In the next derivation we will assume that the inner volume of the tubular reactor is mixed (by natural convection for example) thus the inner concentration is always homogeneous, moreover, a steady state will be also assumed.

Let the inner radius of a tube with circular cross-section be denoted by $R_1$, the outer radius by $R_2$, and its length by L. Then the stationary component current I can be given by the following formula:

$$I=\alpha \cdot D \cdot [2\pi \cdot L/\ln(R_2/R_1)] \cdot (c_R - c_T),$$

which can be approximated in the case of $c_T \ll c_R$ with the next expression:

$$I \approx D^* \cdot [2\pi \cdot L/\ln(R_2/R_1)] \cdot c_R,$$

where we applied the short notation of $D^*=\alpha \cdot D$. Then, regarding the mass balance, the component current I leaving the reactor $$I=-d(c_R \cdot V_R)/dt$$

where $V_R=(R_1)^2 \cdot \pi \cdot L$ is the inner volume of the reactor. This way the following differential equation can be obtained $$dc_R/dt = -\{2D^*/[(R_1)^2 \cdot \ln(R_2/R_1)]\} \cdot c_R,$$

from which the time constant $\tau$ can be expressed as:

$$\tau=[(R_1)^2 \cdot \ln(R_2/R_1)]/(2D^*).$$

In the case of the poly-dimethylsiloxane tubing with $R_1=0.5$ mm inner and $R_2=1$ mm outer radius applied in our experiments, and using the $D^*=1.16 \cdot 7.6 \times 10^{-6}$ cm²/s$=0.88 \times 10^{-5}$ cm²/s value, the time constant $\tau$ is nearly 100 s (within 1 s). This way 3τ (when already 95% of the initial chlorine dioxide amount has left the reactor) is 5 minutes, while 5τ is 8 min 20 s.

Calculation of the Maximum Flow Rate Allowable in a Continuously Fed Tubular Reactor or its Minimum Length at a Given Flow Rate The above considerations can be also applied for a plug-like flow if we assume again steady state conditions and that the chlorine dioxide concentration in the fluid surrounding the tubular reactor is negligible compared to that of inside the reactor. The starting point is that the mixture should stay at least 5τ in the reactor (starting from the time when most of the chlorine dioxide production is over), where τ is the time constant derived in the previous paragraph. If we regard the data of the previous example and take an L=5 m long reactor with an inner diameter of 1 mm ($R_1$=0.5 mm, thus with an inner volume of 4 $cm^3$) then for a residence time around 8 minutes a 0.5 $cm^3$/min flow rate should be applied. For larger flow rates more than 0.7% of the produced chlorine dioxide remains in the reactor. In other words if the flow rate is at least 0.5 $cm^3$/min the fluid surrounding the silicon rubber tubing would contain less than 99.3% of the total chlorine dioxide amount. Reversely, if a flow rate of 1 $cm^3$/min is needed then the volume, consequently the length of the reactor should be doubled. According to our numerical example that means a volume of 8 $cm^3$ corresponding to a tube length of 10 m.

Having generally described the invention, reference now is made to the following examples which are intended to illustrate preferred embodiments and comparisons but which are not to be constructed as limiting to the scope of this invention as is more broadly set forth above and in the appended claims.

EXAMPLES

Example 1

Tubular Reactor with Permeable Walls and a Batch Method to Prepare Aqueous Chlorine Dioxide Solution According to this method the reactor shown on FIG. 3a) can be filled up e.g. with the double syringe shown on FIG. 3b). Syringe 35 containing the $NaClO_2$ solution and syringe 36 containing the acidic solution were inserted into device 37 only after filling them with the reagents. The two solutions can be pushed simultaneously with the device shown on FIG. 3b) into the silicon rubber tube 31 with a length of 7 m, inner diameter 1 mm, outer diameter 2 mm. While flowing in, the reagents are mixed at the beginning of the common tube section 38. After filling it up, the two ends of the silicon rubber tube were closed with a PVC tube section 32. The silicon rubber tube was immersed into the glass bottle 33 containing 0.5 l distilled water as shown on FIG. 3a). The water was stirred with a magnetic stirrer bar 34. The chlorine dioxide evolving inside the silicon rubber tube permeated into the distilled water through the wall of the tube. The concentration of the chlorine dioxide was determined by titration—using 0.01 M thiosulphate volumetric solution—of 2 $cm^3$ samples taken from the solution from time to time. For this purpose before titration the 2 $cm^3$ samples were added to the mixture of 10 $cm^3$ water+2 $cm^3$ 1 M $H_2SO_4$+1 $cm^3$ 1 M potassium iodide. FIG. 4 shows the measured relative chlorine dioxide concentration as a function of time for different experiments. 100% yield, the benchmark of the relative concentrations was considered to be the case when the theoretically maximal $ClO_2$ amount evolves from chlorite, i.e. 4 molecules chlorine dioxide out of 5 molecules chlorite. The theoretical maximum was determined by titrating a small fraction of the chlorite solution used for the actual experiment. In each experiment shown on FIG. 4 syringe I. contained 2 $cm^3$ chlorite solution and syringe II. 2 $cm^3$ acidic solution but the concentration of these reagents varied from experiment to experiment (A-D).

A) Syringe I.: 33% aqueous solution of 80% $NaClO_2$, syringe II.: 50% aqueous solution of citric acid.
B) Syringe I.: 16.5% aqueous solution of 80% $NaClO_2$, syringe II.: 50% aqueous solution of citric acid.
C) Syringe I.: 33% aqueous solution of 80% $NaClO_2$, syringe II.: aqueous solution of 4 M HCl.
D) Syringe I.: an aqueous solution which is 16.5% for 80% $NaClO_2$ and 15% for NaCl,
syringe II.: aqueous solution of 4 M HCl.

Evaluation of Experiments A-D

A) As it can be seen, to approach the final chlorine dioxide concentration needed about 30-40 min as the disproportionation of chlorous acid is a slow process. Furthermore, the conversion did not reach even 40% which is far below the theoretical 62.5%. It is obvious that under these circumstances more chlorate is produced than the unavoidable amount just because of the high initial concentration of chlorite. In this experiment the final concentration of $ClO_2$ in water was 320 ppm (mass/mass: m/m).

B) In this experiment the initial chlorite concentration was decreased to half of the one applied in experiment A), all other parameters were the same. This modification has increased the yield because of the more acidic pH, thus it rised over 50%, but just because of the smaller initial chlorite concentration the reaction was slower, here to approach the final chlorine dioxide concentration needed 50-60 min. In this case the final chlorine dioxide concentration in water was 210 ppm.

C) This experiment is basically the same as experiment A) but now instead of the organic acid hydrochloric acid is used which can result in a faster reaction and give even a 100% yield. Concerning the rate of the reaction the results justified our expectations: chlorine dioxide has reached its final concentration within 12-16 min. Concerning the yield it proved to be true that by using hydrochloric acid the 62.5% theoretical limit with organic acids can be crossed although the measured 65% yield is still far below the theoretical 100%. The reason for this is that because of the high initial concentration of chlorite its disproportionation is still significant compared to the desired reaction between chlorite and chloride. Here the final concentration of $ClO_2$ in water was 540 ppm.

D) This experiment is basically the same as experiment C) but here the concentration of chlorite was decreased to its half in order to slow down the rate of disproportionation, furthermore NaCl was mixed into the chlorite solution to speed up the advantageous reaction between chlorite and chloride. As a result the yield approached 90% while the reaction still remained fast. With this experiment the final concentration of $ClO_2$ in water was 360 ppm.

Estimation of the Reaction Time and the Yield in Hydrochloric Acid Solution

Kiefer and Gordon (Kiefer és Gordon Inorg. Chem. 1968, 7, 239) have found the following rate law for the disproportionation of chlorous acid at 25° C.:

$$-d[HClO_2]/dt = k_1[HClO_2]^2 + k_2[HClO_2][Cl^-]^2/\{K+[Cl^-]\}$$

where $k_1=1.17\times10^{-2}$ $M^{-1}s^{-1}$ is the rate constant for the simple (uncatalyzed) disproportionation reaction (where chlorate is also a product), and $k_2=1.57\times10^{-2}$ $M^{-1}s^{-1}$ (in 1.2 M perchloric acid) or $k_2=3.00\times10^{-2}$ $M^{-1}s^{-1}$ (in 2 M $HClO_4$) is the rate constant of the decomposition catalyzed by chloride ion (where the products are only chlorine dioxide and chloride). As K=0.0012 M and in our case the concentration of chloride is always much higher than this value the rate law can be written in the following simplified form:

$$-d[HClO_2]/dt \approx k_1[HClO_2]^2+k_2[HClO_2][Cl^-]$$

which rate equation will be referred to as the "simplified Kiefer-Gordon formula". Whenever we apply organic acids the second term can be neglected. In this case the reaction would be theoretically a second order reaction if the solution contained pure chlorous acid only. However, in experiments A) and B) one has to take into account that at the pH established by the citric acid only a part of the added chlorite appears in its protonated form as chlorous acid, and this fact makes the calculations rather complicated.

The situation is more simple in experiments C) and D) where because of the hydrochloric acid—which seemed to be beneficial concerning the yield—most of the added chlorite is in protonated form. In this case the simplified Kiefer-Gordon formula can be a useful guide for us when we want to find the optimum parameters to produce $ClO_2$. It is obvious that in order to reach an optimum yield the first reaction route (the simple disproportionation producing chlorate) must be suppressed compared to the second one (the $ClO_2$ production catalysed by chloride ions). According to our formula this can be achieved by decreasing the initial chlorous acid concentration and increasing the chloride concentration. Even a quantitative formula can be deduced for the efficiency $\eta$ of $ClO_2$ production:

$$\eta=5/8+(3/8X)\cdot\ln(1+X)$$

where $X=k_1[HClO_2]_0/k_2[Cl^-]$ ($[HClO_2]_0$ is the initial chlorous acid concentration).

So it can be seen that when the value of X is high ($X\to\infty$) then $\eta\to 5/8$ (i.e. the route leading to chlorate dominates) and when $X\to 0$ then (i.e. here the decomposition catalysed by chloride is the dominant route).

The parameters given by Kiefer and Gordon can be regarded as estimates only for the concentrated solutions we apply. E.g. in experiments C) and D) the solution has reached the final concentration after a 12-15 min waiting time but the calculated value would be only around 5 min using $k_2=1.57\times10^{-2}$ $M^{-1}s^{-1}$. It is more feasible to use the real experimental values also because so far in our calculations we treated diffusion (which gave an approx. 8 min waiting time) and chemical reaction as separate processes although these are parallel ones. However, it is interesting to note that the sum of the two times (diffusion: 8 min+chemical reaction: 5 min altogether 13 min) as a rough estimate shows a relatively acceptable agreement with the 12-15 min measured in the experiments.

Permeation of Other Components

It is a very important point that in each experiment A)-D) it was examined whether the acid we used—especially hydrochloric acid, or chloride ion—permeates through the silicon rubber wall. Surprisingly we have found that the quantity that permeated was below the detection limit for these components.

In these tests we took 30 $cm^3$ samples from the solution. First $ClO_2$ was removed from the samples by sucking air through them for 5 min with an aspirator. (That was necessary because $ClO_2$ would have disturbed the measurements with a pH paper as it bleaches the dye in it.) Then the $ClO_2$ free sample was tested for chloride ion or for acid, respectively.

Chloride Ion

Chloride ion is present implicitly in each recipe as we have used the 80% commercial grade $NaClO_2$ which also contains 16% NaCl. (The remaining 4% is a mixture of $Na_2CO_3$ and NaOH that are used for stabilisation.) The highest concentration of chloride (more than 3 M) was applied in experiment D).

According to our measurements the chloride ion content of the $ClO_2$ solution was below the detection limit (which was around 2 ppm (m/m) with the applied method using silver nitrate) even when the solution remained in contact with the silicon rubber tube containing the exhausted reagents for more than 24 hours even in the case of maximal chloride concentrations applied.

Acid

The pH of the distilled water in the beaker has not deviated from the original value (pH=5.5-6) even if the $ClO_2$ solution was prepared according to recipe C) or D) and even if it remained in contact with the silicon rubber tube for 24 hours in which the hydrochloric acid concentration of the exhausted solutions exceeded 1 M in recipe D).

Conclusions i) According to our measurements by using the permeation method described above a very high selectivity can be reached: while the permeation of $ClO_2$ is a very fast process, the permeation of the other components is immeasurably slow even after a long time.

ii) Beside hydrochloric acid organic acids are also suitable to establish the required acidic pH but by using these the yield is lower and the reaction is also slower. At a given application one has to decide whether it is the conversion and the reaction rate (enhanced by hydrochloric acid) or the environment-friendly nature of the applied acid that really matters; the latter requirement favours the application of organic acids.

Example 2

Countercurrent Tubular Reactor with Permeable Walls and a Continuous Method to Produce Chlorine Dioxide—Containing Gas or Water Streams The device can be designed based on point D) of Example 1. (henceforth: Experiment D)). As shown in FIG. 5. the two solutions are pumped by two peristaltic pumps 51 and 52 continuously into the core of the silicon rubber tube 53 around which water or air is kept flowing by pump 54. The endproduct—the fluid (water or air) saturated with $ClO_2$—leaves the reactor at vent 55 while the exhausted reagents are collected in tank 56. The silicon rubber permeation reactor 53 has a length of 7 m, inner diameter 1 mm and outer diameter 2 mm. (This is the same tube that was applied in Experiment D).) As, according to our experiments, the time needed to reach maximal conversion is at least 12 min and the inner cubic capacity of the tube is 5.5 $cm^3$, the maximum value of the flow rate in the tube can be 0.46 $cm^3$/min. This means that both solution I. (an aqueous solution which is 16.5% for 80% $NaClO_2$ and 15% for NaCl) and solution II. (aqueous solution of 4 M HCl) can be pumped with a flow rate of 0.23 $cm^3$/min. However, one also has to take into account that $CO_2$ bubbles evolve from the $Na_2CO_3$ which can be found in the 80% $NaClO_2$ and this increases the effective flow rate by about 10% according to our observations. That is it is worth to choose the flow rate to be 0.40 (0.20+0.20) $cm^3$/min. In this case it takes 10 min to pump into the countercurrent tubular reactor that amount of reagents which gave 500 cm³ of 360 ppm (m/m) $ClO_2$ solution in Experiment D). In other words, if the pump 54 ensures a flow rate of water of 50 cm³/min then a 360 ppm aqueous solution of chlorine dioxide can be produced continuously. The concentration of the produced chlorine dioxide solution can be controlled by the flow rate of both the reagents and the water. E.g. if we keep the flow rate of water constant while we decrease the flow rate of the reagents to its half (to 0.10 cm³/min) then the concentration of $ClO_2$ also decreases to its half. From a practical aspect it is even more important that the concentration of $ClO_2$ can be controlled by the flow rate of water. Thus if we apply the above mentioned maximal flow rate of the reagents along with a 0.5 dm³/min flow rate of water then we get a 36 ppm aqueous solution of chlorine dioxide which can be favourably used for disinfecting wounds. However, in the case of a 10 cm³/min flow rate of water we can produce a more concentrated, 1800 ppm $ClO_2$ solution continuously.

With the method described in the previous paragraph according to FIG. 5. it is possible to produce not only an aqueous solution of water but also a flow of $ClO_2$ containing air in a continuous and controlled way. However, in this case the pump 54 carries not water but air. Considering that a 360 ppm (m/m) aqueous $ClO_2$ solution with a flow rate of 50 cm³/min contains 18 mg/min $ClO_2$ (which is equivalent to 263 μmol/min $ClO_2$), using air instead of water with a flow rate of 1 m³/min this air will contain 5.9 ppm (volume/volume: V/V) $ClO_2$ at 20° C. (It is worth to mention that it is not necessary to drive such a great air flow through the outer tube. E.g. if we have only a flow rate of 100 dm³/min there then we can mix it with a flow rate of 900 dm³/min.) Such a big amount of air containing a relatively small amount of $ClO_2$ can be used for sterilisation of rooms or apartments. The amount and the concentration of $ClO_2$ can be controlled by the flow rate of reagents and of the target medium which is air in this case.

Example 3

A Micro-Reactor Applying a Flat Silicone Rubber Membrane and Hydrogel Embedded Reagents to Establish a Slow Focused Chlorine Dioxide Input of Small Quanta In examples 1. and 2. we have presented devices which can be used for the production of chlorine dioxide-containing water or air. These fluids containing pure chlorine dioxide can be used to flood places where we need e.g. the biocid effect of chlorine dioxide. Anyway, it can happen that we want to apply chlorine dioxide not in a great quantity, homogeneously spread in a big space but only in minute quantities, focussed on a limited area. In this case our intention is to construct a disposable, small reactor which can be used also by a non-professional person easily, without any risk. FIG. 6. shows such a micro-reactor.

FIG. 6.a) shows the cross-sectional view of the micro-reactor. The bottom of the reactor is the disk 61 made of a textile reinforced silicon rubber membrane with a thickness of 0.3 mm and diameter of 18 mm. The membrane disk is glued to the silicon rubber ring 62 with the silicon rubber adhesive Elastosil® SK-42. The silicon rubber ring is cut out of a 2 mm thick silicon rubber sheet Pemüsil®, its inner diameter is 14 mm and the outer one 18 mm. Over the silicon rubber membrane is the hydrogel 63 containing $NaClO_2$ and over that one the hydrogel 64 containing citric acid. Both hydrogels are made of polyacryl-amide crosslinked by N,N'-methylene-bis-acrylamide and filled with aerosyl. Polymerisation was carried out between glass plates and the result was a 1 mm thick hydrogel plate. From this plate 14 mm diameter disks were cut, one half of them was immersed in 50% citric acid solution, the other half in 33% solution of 80% $NaClO_2$ for at least 2 hours before using them. The whole device is closed by a soft PVC cap 65. This was made by cutting a ring with an inner diameter of 18 mm and an outer diameter of 22 mm from a 2.2 mm thick soft PVC sheet and then a 0.1 mm thick soft PVC foil disk with a diameter of 22 mm was glued to it with cyclohexanone which is a solvent of PVC. (Of course, the soft PVC case can also be made in one piece, and in case of a standardised production that would be more convenient.)

FIG. 6.b) shows the set-up of the micro-reactor consisting of basically four parts. First the gel disk 63 containing the $NaClO_2$ solution is placed into the silicon rubber cup of the reactor (the cup consists of the membrane 61 and the silicon rubber ring 62) and then the gel disk 64 containing citric acid is placed on it. Then the silicon rubber cup containing the gel rings is closed by the PVC cap 65. With a careful installation of the flexible cap the amount of air enclosed in the reactor should be kept at a minimum. After setting up the reactor the reaction starts only slowly as the diffusion time constant of the 1+1=2 mm thick hydrogel layer is in the order of a few minutes and also because the rate of the reaction with citric acid is slow. So there is enough time to set up the reactor. As we have seen chlorine dioxide is well soluble both in water and in silicon rubber, this is why it can diffuse through both hydrophilic and lipophilic zones in biological tissues. Here the use of citric acid—instead of hydrochloric acid—is more convenient as in this case on the one hand, the evolution of chlorine dioxide is slower and so longer treatments are feasible and on the other hand, an accidental contact with the gel containing citric acid is not so disturbing for the tissues.

Example 4

A Micro-Reactor Applying a Flat Silicone Rubber Membrane and Liquid Reagents to Establish a Focused Fast Chlorine Dioxide Input of Small Quanta The fact that chlorine dioxide evolution is a slow process in case of Example 3 was an advantage there because of the longer time needed for the treatment. There are cases, however, where the chlorine dioxide escaping from the micro-reactor comes into touch with the microbes instantly and so a fast treatment is more advantageous. In these cases it is more convenient to use the micro-reactor shown in FIG. 7.

FIG. 7.a) shows the cross-sectional view of the micro-reactor containing the liquid mixture of reagents. Also in this case $ClO_2$ leaves the reactor through a textile reinforced silicon rubber membrane disk 71 which has a thickness of 0.3 mm and a diameter of 14 mm. Similarly like in Example 3 this membrane is glued to the silicon rubber housing 73. However, in this case the silicon rubber housing 73 is not a ring-shaped one but its upper part is closed. This housing was constructed so that first a ring was cut out from a 2 mm thick Pemüsil® silicon rubber plate with an inner diameter of 10 mm and outer diameter of 14 mm and then a silicon rubber disk with a diameter of 14 mm and a thickness of 1 mm was glued to it. So in this construction the mixture of reagents 72 is totally surrounded by silicon rubber walls. Also in this case the silicon rubber reactor body is covered by a soft PVC cap 74. Because of this cap $ClO_2$ can leave the reactor only through the silicon rubber membrane. The PVC cap 74 was constructed by gluing a soft PVC ring having a height of 4 mm, outer diameter of 18 mm and inner diameter of 14 mm to a soft PVC disk having a thickness of 0.1 mm and a diameter of 18 mm.

FIG. 7.b) shows how to fill up the reactor. 0.5-0.5 cm$^3$ of the two reagents (33% solution of 80% $NaClO_2$ and 4 M hydrochloric acid, respectively) are mixed in a small closed vessel and we suck a few tenths of milliliters from this mixture with the syringe 75. We push the needle through the silicon rubber and the PVC walls and we inject the mixture into the reactor. As the reactor is a closed vessel there is another syringe needle 76 to let the air escape freely. After filling up the reactor we pull out the needles and the reactor is ready to use. (The small channels opened by the fine needles close up after pulling out the needles and no liquid can escape through them.)

Example 5

Block Diagram of an Apparatus with Higher Capacity to Produce Chlorine Dioxide-Containing Water Continuously All the examples presented up to this point were devices with small capacity. In this prospective example we want to show how to construct a $ClO_2$-generating permeation reactor with a higher capacity. Obviously, we have to use devices where the transport surfaces are large enough. E.g. instead of a single silicon rubber tube more tubes connected in parallel, i.e. a so-called "shell and tube" component exchanger (here we use the word "component exchanger" as an analogue to "heat exchanger"), or rather a "plate and frame" component exchanger.

FIG. 8. shows the block diagram of a $ClO_2$-solution producing device with greater capacity that separates $ClO_2$ from the reagents by permeation method. The device contains two permeator units 86 and 87. Unit 86 operates both as a reactor and as a permeator while unit 87 operates only as a permeator. Reagent A (e.g. $NaClO_2$ solution) is driven by pump 81 while reagent B (e.g. hydrochloric acid solution) is driven by pump 82 into the mixing space 85. Pump 83 ensures a strong recirculation: it drives the gross of the liquid flow coming from the permeator 86 back into the mixing space 85. Mixing is ensured by the strong stream of the liquid flowing into the mixing space 85 from the recirculation pump 83. Recirculation is needed because this way the yield can reach 99% or even more (see the numerical example below). However, because of the recirculation the flow leaving the permeator 86 contains still a significant amount of $ClO_2$ which is extracted by permeator 87. It is pump 84 that drives clear water into the water-side branch of permeator 87. Both permeator 86 and 87 operate as counter-current component exchangers. Clear water enters in the top of permeator 87 in counter-current and at the same place exits the flow of the used reagents 88 which contains only a very small amount of $ClO_2$. The flow of water already contains some $ClO_2$ after leaving the permeator 87 and in this way it enters the permeator 86—also in counter-current. Here much more $ClO_2$ permeates into the water and then at the bottom of the permeator 86 exits the flow of $ClO_2$-containing water 89 which is the final product of the whole process. The vertical position of the permeators and the upward directed flow of the reagents help $CO_2$ bubbles (which evolve from the $Na_2CO_3$ that is present in the $NaClO_2$ in some percent) leave the permeators easily.

Numerical Example

Here we demonstrate the operation of the device shown on FIG. 8. with a numerical example. Suppose that the permeation devices are of "plate and frame" type and that both of them contain 100 silicon rubber plates, each of them having a thickness of 0.5 mm, a width of 0.5 m and a length of 2 m. The distance among the silicon rubber plates is 2 or 7 mm respectively, the bigger space is for the flow of water and the smaller one for the reagents. Thus the outer height of the permeators is a little bit more than 2 m and the floor space is a little bit more than 0.5 m×0.5 m. The total volume of the 50 cells, each having a width of 2 mm, where the reagents flow is 100 L. Let the volume of the mixing space 85 be 20 L. Let the pump 81 feed in 1 L/min of 2 M $NaClO_2$ solution and the pump 82 1 L/min 4 M HCl solution. Let the circulating pump 83 run with a flow rate of 20 L/min and the water pump 84 with 60 L/min. Our aim is to calculate under these circumstances the 1) efficiency of chlorine dioxide production from $NaClO_2$,
2) $ClO_2$ loss leaving the reactor in the by-product stream 88, and
3) $ClO_2$ concentration in the product stream 89.

The calculations will be carried out supposing a stationary state and will be based partly on our measurement results and partly on the Kiefer-Gordon equation.

1) To calculate the efficiency of chlorine dioxide production from $NaClO_2$ let us consider the balance equation for $NaClO_2$. In the stationary state of the reactor 86 with a total volume of V=120 L the amount of $NaClO_2$ input is equal to the sum of the amounts of $NaClO_2$ reacting there and that of leaving the reactor, i.e.

$$w \cdot c_0 = V \cdot r + 2w \cdot c,$$

where $c_0$ and $c$ is the concentration of $NaClO_2$ in the reagent solution A and in the reactor-permeator 86, respectively; w=1 L/min is the inflow rate of the $NaClO_2$ or HCl solution, respectively; and r is the reaction rate. According to the simplified Kiefer-Gordon equation $$r = k_1 \cdot c^2 + k_2^* \cdot c + k_2^* \cdot c,$$

where $k_2^* = k_2 \cdot [Cl^-] = 3.00 \times 10^{-2}\ M^{-1}s^{-1} \cdot (2M) = 6 \times 10^{-2}\ s^{-1}$, and the motivation for neglecting the first term will be discussed later. Substituting the expression for r into the component balance equation c can be expressed as $$c = c_0/(2 + V \cdot k_2^*/w).$$

As the value of the dimensionless expression $V \cdot k_2^*/w$ is 432 in our case so $c = 2.3 \times 10^{-3} \cdot c_0 = 4.6 \times 10^{-3}$ M. As the concentration of $NaClO_2$ in a non-reacting mixture would be $c_0/2 = 1$ M, the former result means that only 0.46% of the initial amount of $NaClO_2$ leaves the reactor without reaction. However, the solution leaving the reactor 86 spends further 50 min (100 L/(2 L/min)=50 min) in the next permeator 87 and so if we consider that the time constant for the decay of $NaClO_2$ in this medium is merely $1/k_2^* = 17$ s, we see that it is only an incredible small portion ($10^{-76}$) that can leave also the second permeator without reaction. So practically the whole amount of $NaClO_2$ goes into reaction.

However, we still have to examine whether—beside the chloride ion catalysed decay of $NaClO_2$ discussed above leading wholly to $ClO_2$ production—the disproportionation of $NaClO_2$ also plays a role where chlorate is also a product. According to the simplified Kiefer-Gordon equation the rate of the reaction route leading to chlorate compared to that of leading to chlorine dioxide is $$k_1 \cdot c^2/(k_2^* \cdot c) = (k_1 \cdot c)/k_2^* = (1.17 \times 10^{-2}\ M^{-1}s^{-1}) \cdot (4.6 \times 10^{-3}\ M)/6 \times 10^{-2}\ s^{-1} = 0.9 \times 10^{-3},$$

i.e. the relative weight of chlorate production is below 1‰. It means that this reaction is really negligible and it justifies that the first term in the Kiefer-Gordon equation is ignored. With this we can answer our first question: in our device with the parameters given in our numerical example the conversion of $NaClO_2$ to $ClO_2$ is over 99.9%.

2) To calculate the $ClO_2$ loss leaving the reactor in the by-product stream 88 let us consider the balance equations for chlorine dioxide. In stationary state in the reactor-permeator 86 the amount of chlorine dioxide produced there and the one leaving by permeation and with the liquid flow are equal, i.e.

$$V \cdot r_x = x \cdot D^* \cdot A/d + 2w \cdot x,$$

where $r_x$ stands for the evolution rate of chlorine dioxide, x for the stationary concentration of $ClO_2$ in the reactor, $D^* = D \cdot \alpha = 0.88 \times 10^{-5}$ cm$^2$/s (see above: measurement of D and $\alpha$), A=100 m$^2$ is the surface area of the silicon rubber plates in the permeator, d=0.05 cm is the thickness of the silicon rubber plates. (Here we suppose that the concentration of $ClO_2$ is much higher in the reagent solutions than in water.) The term $V \cdot r_x$ can also be calculated using the data from the former calculation that 99.5% of the $NaClO_2$ flowing into the reactor 86 is transformed to $ClO_2$ there. As 5 molecules of $NaClO_2$ give 4 molecules of $ClO_2$ so $$V \cdot r_x = 0.995 \cdot (4/5) \cdot c_0 \cdot w = 0.796 \cdot c_0 \cdot w = 1.592 \text{ mol/min}$$

Substituting this into the balance equation for $ClO_2$ x can be expressed as $$x = 0.796 \cdot c_0 / [2 + (D^* \cdot A/d \cdot w)]$$

Substituting the appropriate values $D^* \cdot A/d = 10.6$ L/min and so x=0.126 M. The permeation mass flow $J_P$ is $$J_P = x \cdot D^* \cdot A/d = 1.34 \text{ mol/min}$$

so the balance equation for $ClO_2$ written with the real values is 1.592 mol/min=1.34 mol/min+2·0.126 mol/min.

It can be seen that although the greater part (1.34/1.592≈75%) of the $ClO_2$ leaves the reactor 86 by permeation the remaining 25% still moves together with the reagents to permeator 87 which is aimed to take out the rest of $ClO_2$.

So the solution arriving into the second permeator contains $ClO_2$ in a concentration of 0.126 M and also some $NaClO_2$ whose concentration is 0.0046 M. However, the latter species is transformed wholly to $ClO_2$ in the first minutes of the total 50 min which is the residence time in the second permeator giving (4/5)·0.0046≈0.004 M chlorine dioxide. So in the calculations we can write that the $ClO_2$ concentration of the solution entering the permeator 86 is 0.126+0.004=0.13 M. This solution passes between two silicon rubber plates with a thickness of 0.05 cm whose distance is L=0.2 cm. If we consider the solution with $ClO_2$ concentration y to be a well-mixed solution because of the flow then we can write the following differential equation for this system:

$$dy/dt = -[2D^*/(L \cdot d)] \cdot y$$

supposing that the $ClO_2$ concentration in the water on the other side of the silicon rubber plates is much smaller that between the two plates. Using our data $$2D^*/(L \cdot d) = 1.76 \times 10^{-3} \text{ s}^{-1}$$

so the $ClO_2$ concentration in the water flowing upwards in the second permeator will decrease exponentially in time with a time constant of $$\tau = 1/(1.76 \times 10^{-3}) = 568 \text{ s}.$$

This means that during the 50 min=3000 s residence time the $ClO_2$ concentration decreases from the initial value of $y_0 = 0.13$ M to $$y = y_0 \cdot [\exp(-3000/568)] = 0.13 \text{ M} \cdot 0.005 = 6.5 \times 10^{-4} \text{ M}.$$

So the $ClO_2$ concentration of the solution leaving the top of the permeator 87 with a flow rate of 2 w=2 L/min is $6.5 \times 10^{-4}$ M which is a 44 ppm (m/m) solution. Considering that in case of 100% conversion a 2 M $NaClO_2$ solution fed with a flow rate of 1 L/min would yield a (4/5)·2=1.6 mol/min $ClO_2$ flow and that the loss is 2 L/min·$6.5 \times 10^{-4}$ M=1.3 mmol/min so the relative loss is 0.08% i.e. less than 1‰.

3) Finally the $ClO_2$ concentration in the product stream 89 can be calculated knowing that the 0.9992·1.6=1,599 mol/min $ClO_2$ flow is mixed with 60 L/min water. This gives a 0.0266 M i.e. 1796 ppm $ClO_2$ solution which is produced with a rate of 60 L/min.

Chlorine dioxide production with the device shown in FIG. 8. based on the reduction of chlorate by hydrogen peroxide or applying any other $ClO_2$ producing reaction Without giving a numerical example here we want to emphasize that the permeation device shown in FIG. 8. can also be operated with other $ClO_2$ producing reactions. E.g. if reagent A is sodium chlorate in sulphuric acid solution (instead of the $NaClO_2$) and reagent B is hydrogen peroxide then we apply the same $ClO_2$ producing reaction which is often used in paper and pulp industry.

The invention claimed is:

1. Method for preparing a fluid containing pure chlorine dioxide or for delivering pure chlorine dioxide into any fluid target medium capable of dissolving chlorine dioxide, wherein
   chlorine dioxide generated in an aqueous solution contaminated with other components is provided
   the obtained contaminated aqueous solution of chlorine dioxide is contacted with a pore free polymeric membrane made of silicone rubber, and
   the dissolved chlorine dioxide provided in the above contaminated aqueous solution is transported across the pore free polymeric membrane made of silicone rubber via selective permeation directly from the contaminated aqueous solution into a fluid target medium, which is a liquid or a gas or any other medium which is capable of dissolving chlorine dioxide.

2. The method of claim 1, wherein the silicone rubber is selected from the group consisting of silicone based composite rubber, cross-linked polyorganosiloxane, crosslinked poly (dimethylsiloxane) and silicone based composite rubber containing other auxiliary components besides the silicone compounds.

3. The method of claim 1, wherein the chlorine dioxide is generated by mixing solutions of an alkali chlorite and an inorganic acid or an organic acid in a reaction vessel.

4. The method of claim 1, wherein the chlorine dioxide is generated by the oxidation of an aqueous solution of an alkali chlorite by chlorine or any other oxidizing agent or by electrochemical means in a reaction vessel or in an electrochemical cell.

5. The method of claim 1, wherein the chlorine dioxide is generated by the reduction of an aqueous solution of an alkali chlorate in a batch or a continuously fed stirred tank reactor by methanol, hydrogen peroxide or by any other reducing agent or by electrochemical means.

6. The method of claim 1, wherein
   a) a continuous flow of the fluid target medium is maintained by a delivery pump or by any other means,
   b) in the case of continuous chlorine dioxide production a countercurrent flow of the fluid target medium and of the contaminated aqueous solution is applied.

7. The method of claim 1, wherein two components being dissolved in separate hydrogel pieces of the chlorine dioxide generating reaction are delivered into a batch reactor where due to the contact of the two hydrogels and the diffusion of the two components chlorine dioxide is produced and transported from the reactor through the pore free polymeric membrane into the fluid target medium.

8. The method of claim 1, wherein components of the chlorine dioxide generating reaction are mixed to form an aqueous mixture and subsequently the aqueous mixture is loaded into a closed reactor thereby filling the reactor, while air is removed from the reactor, where after the loading chlorine dioxide is produced in a fast reaction and transported directly from the aqueous solution in the reactor through the pore free polymeric membrane into the fluid target medium.

9. The method of claim 1, wherein fresh reagents necessary for chlorine dioxide production are pumped into a mixing chamber, then conducted through a re-circulated first permeator-reactor in such a way that a larger part of a stream of not completely exhausted reagents leaving the first permeator-reactor is re-circulated into the mixing chamber causing an intense mixing of the not completely exhausted reagents and the fresh reagents there, and a smaller part of the not completely exhausted reagent flow leaving the first permeator-reactor is conducted through an auxiliary permeator-reactor where evolving chlorine dioxide permeates into a flow of the fluid target medium which is conducted first through the auxiliary permeator-reactor and then through the first permeator-reactor always in a countercurrent direction with respect to the flow of the reactants.

10. The method of claim 1 whereby a fluid containing pure chlorine dioxide being substantially not contaminated with starting materials or with byproducts of chlorine dioxide synthesis is obtained.

11. The method of claim 1, wherein the chlorine dioxide is generated by mixing solutions of sodium chlorite and hydrochloric acid.

12. The method of claim 1 wherein the permeation of $ClO_2$ is fast and the permeation of the other components is immeasurably slow.

13. The method of claim 1 wherein the membrane is less permeable for starting materials and byproducts of chlorine dioxide synthesis at least by 3 orders of magnitude compared to chlorine dioxide.

14. The method of claim 1 wherein the target medium is an aqueous solution.

15. An apparatus for producing a fluid containing pure chlorine dioxide, said apparatus comprising:
- a reinforced pore free polymeric membrane;
- a gasket ring adhered to said membrane;
- a first hydrogel disk containing a first reactant;
- a second hydrogel disk containing a second reactant;
- a cap made of a material which is impermeable for chlorine dioxide closing an upper part of a permeator-reactor;

wherein the first and second reactants react in a diffusion limited reaction within the two contacting hydrogels and the slowly produced chlorine dioxide leaves the permeator-reactor by diffusing first through the hydrogels and then the pore free polymeric membrane.

16. The apparatus of claim 15, wherein said reinforced pore free polymeric membrane is a reinforced silicone rubber membrane the thickness of which is from 0.1 to 1 mm.

17. The apparatus of claim 16, wherein said silicone rubber is selected from the group consisting of silicone based composite rubber, cross-linked poly-organosiloxane, crosslinked poly(dimethylsiloxane) and silicone based composite rubber containing other auxiliary components besides the silicone compounds.

* * * * *